United States Patent
Wu et al.

(10) Patent No.: US 12,326,654 B2
(45) Date of Patent: Jun. 10, 2025

(54) OPTICAL ELEMENT DRIVING MECHANISM

(71) Applicant: TDK TAIWAN CORP., Taoyuan (TW)

(72) Inventors: Ya-Hsiu Wu, Taoyuan (TW); Yi-Ho Chen, Taoyuan (TW); Ying-Jen Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 630 days.

(21) Appl. No.: 17/675,603

(22) Filed: Feb. 18, 2022

(65) Prior Publication Data
US 2022/0283407 A1    Sep. 8, 2022

Related U.S. Application Data

(60) Provisional application No. 63/157,095, filed on Mar. 5, 2021.

(51) Int. Cl.
| | |
|---|---|
| *G03B 5/00* | (2021.01) |
| *G02B 7/04* | (2021.01) |
| *G02B 13/00* | (2006.01) |
| *G03B 9/10* | (2021.01) |

(52) U.S. Cl.
CPC ............ *G03B 5/00* (2013.01); *G02B 7/04* (2013.01); *G02B 13/001* (2013.01); *G03B 9/10* (2013.01); *G03B 2205/0069* (2013.01)

(58) Field of Classification Search
CPC .. G03B 5/00; G03B 2205/0069; G03B 13/36; G03B 2205/0007; G03B 3/10; G03B 30/00; G03B 2205/0023; G03B 9/10; G03B 9/02; G03B 9/08; G02B 27/646; G02B 7/09; G02B 7/04; G02B 13/001; G02B 7/08

See application file for complete search history.

(56) References Cited

U.S. PATENT DOCUMENTS

| | | | | |
|---|---|---|---|---|
| 2009/0002825 | A1* | 1/2009 | Morita | G03B 5/00 |
| | | | | 359/554 |
| 2011/0181740 | A1* | 7/2011 | Watanabe | G03B 13/36 |
| | | | | 348/E5.031 |
| 2019/0235267 | A1* | 8/2019 | Minamisawa | G02B 7/08 |
| 2021/0006720 | A1* | 1/2021 | Enta | H04N 23/45 |
| 2022/0003958 | A1* | 1/2022 | Jeong | G02B 7/02 |
| 2023/0251502 | A1* | 8/2023 | Kwon | G03B 17/17 |
| | | | | 359/555 |

* cited by examiner

*Primary Examiner* — Darryl J Collins
*Assistant Examiner* — Matthew Y Lee
(74) *Attorney, Agent, or Firm* — Muncy, Geissler, Olds & Lowe, P.C.

(57) ABSTRACT

An optical element driving mechanism is provided, including a movable part, a fixed part, and a driving assembly. The movable part is used for connecting an optical element. The movable part is movable relative to the fixed part. The driving assembly is used for driving the movable part to move relative to the fixed part. The driving assembly is used for driving the movable part to move in a first dimension.

18 Claims, 11 Drawing Sheets

OPTICAL ELEMENT DRIVING MECHANISM

CROSS REFERENCE TO RELATED APPLICATIONS

This application claims the benefit of U.S. Provisional Application No. 63/157,095, filed 5 Mar. 2021, the entirety of which is incorporated by reference herein.

BACKGROUND OF THE INVENTION

Field of the Invention

The present disclosure relates to an optical element driving mechanism, and more particularly to an optical element driving mechanism in an electrical device.

Description of the Related Art

As the relevant technologies have been developed, many electronic devices (such as computers and tablets) have been equipped with the capability to record images and videos. However, when an optical element (such as a lens) having a long focal length is installed in an electronic device, this may increase the thickness of the electronic device, impeding the prospects for miniaturization of the electronic device. Therefore, how to design an optical element driving mechanism and an optical device that help to miniaturize the electronic device has become an important issue.

BRIEF SUMMARY OF THE INVENTION

To solve the problems of the prior art, an optical element driving mechanism is provided, including a movable part, a fixed part, and a driving assembly. The movable part is used for connecting an optical element. The movable part is movable relative to the fixed part. The driving assembly is used for driving the movable part to move relative to the fixed part. The driving assembly is used for driving the movable part to move in a first dimension.

In one of the embodiments of the present disclosure, the movable part includes a movable part setting surface. The movable part setting surface is parallel to the first axis and the third axis. The first axis is perpendicular to the third axis. The movable part setting surface is perpendicular to the second axis. The second axis is perpendicular to the first axis. The second axis is perpendicular to the third axis. The optical element driving mechanism with an elongated structure extends along the first axis when viewed along the second axis. The first dimension is a rotation about a first rotation axis. The first rotation axis is parallel to the first axis.

In one of the embodiments of the present disclosure, the driving assembly includes: a first magnetic element; a first coil, corresponding to the first magnetic element; a first magnetic element magnetic conductive element, having a magnetic conductive material, and corresponding to the first magnetic element; and a first coil magnetic conductive element, having a magnetic conductive material, and corresponding to the first coil. The shortest distance between the first magnetic element magnetic conductive element and the first magnetic element is shorter than the shortest distance between the first magnetic element magnetic conductive element and the first coil. The shortest distance between the first coil magnetic conductive element and the first magnetic element is greater than the shortest distance between the first magnetic element magnetic conductive element and the first coil. When viewed along the second axis, the first magnetic element is located between the first magnetic element magnetic conductive element and the first coil magnetic conductive element. The first coil is wound around the first coil magnetic conductive element. The winding axis of the first coil is parallel to the second axis.

In one of the embodiments of the present disclosure, the first magnetic element is fixedly disposed on a movable part frame of the movable part. The first magnetic element magnetic conductive element is fixedly disposed on the movable part frame. The first magnetic element magnetic conductive element is located between the first magnetic element and the movable part frame. The first coil is fixedly disposed on the fixed part. A first magnetic element first surface of the first magnetic element faces the first coil. The first magnetic element is fixedly connected to the movable part frame through a first connecting element. The first connecting element is in direct contact with the first magnetic element. The first connecting element is in direct contact with a first magnetic element second surface of the first magnetic element. The first magnetic element second surface is not parallel to the first magnetic element first surface. The first magnetic element second surface is perpendicular to the first magnetic element first surface. The first connecting element s in direct contact with the movable part frame. The first connecting element is in direct contact with the first magnetic element magnetic conductive element.

In one of the embodiments of the present disclosure, the movable part frame further includes a first magnetic element accommodating portion corresponding to the first magnetic element. The first magnetic element second surface is at least partially exposed to the movable part frame when viewed along the second axis. A base of the fixed part further includes a first coil magnetic conductive element accommodating portion, and the first coil magnetic conductive element accommodating portion corresponds to the first coil magnetic conductive element. The first magnetic element magnetic conductive element is at least partially exposed to the base when viewed along the second axis. The first magnetic element second surface is perpendicular to the second axis. The base has a plate-like structure. The first coil is fixedly connected to the base through a second connecting element.

In one of the embodiments of the present disclosure, the second connecting element is in direct contact with the first coil. The second connecting element is in direct contact with the base. The second connecting element is disposed in the first coil magnetic conductive element accommodating portion. The second connecting element is in direct contact with the first coil magnetic conductive element. The second connecting element overlaps the first coil and the first coil magnetic conductive element when viewed along the third axis. The first coil magnetic conductive element accommodating portion has an opening structure. When viewed along the first axis, the first coil magnetic conductive element is exposed to the movable part frame through the first coil magnetic conductive element accommodating portion.

In one of the embodiments of the present disclosure, the optical element driving mechanism further includes a stopping assembly, for limiting the range of motion of the movable part relative to the fixed part, wherein the stopper element includes: a first stopping structure; a second stopping structure, corresponding to the first stopping structure and movable relative to the first stopping structure; and a third stopping structure, corresponding to the first stopping structure and fixedly connected to the second stopping structure. When a movable part frame of the movable part is located at a first position relative to the fixed part, the second stopping structure is in direct contact with the first stopping structure. When the movable part frame of the movable part is located at the first position relative to the fixed part, there is a gap between the third stopping structure and the first stopping structure. When the movable part frame of the movable part is located at the first position relative to the fixed part, the shortest distance between the third stopping structure and the first stopping structure is less than 0.1 mm.

In one of the embodiments of the present disclosure, the first stopping structure is used to fix the driving assembly. The first stopping structure is in direct contact with the driving assembly. The first stopping structure is in direct contact with the first coil. The first stopping structure includes a first stopping structure first stopping portion, corresponding to a second stopping structure first stopping portion and a second stopping structure second stopping portion of the second stopping structure. When the movable part frame of the movable part is located at the first position relative to the fixed part, the second stopping structure first stopping portion is in direct contact with the first stopping structure first stopping portion. When the movable part frame of the movable part is located at a second position relative to the fixed part, the second stopping structure second stopping portion is n direct contact h the first stopping structure first stopping portion. The first stopping structure further includes a first stopping structure, a second stopping portion corresponding to a third stopping structure first stopping portion of the third stopping structure. The first stopping structure further includes a first stopping structure third stopping portion corresponding to a third stopping structure second stopping portion of the third stopping structure.

In one of the embodiments of the present disclosure, when the movable part frame of the movable part is located at the first position relative to the fixed part, the shortest distance between the third stopping structure first stopping portion and the first stopping structure second stopping portion is less than 1 mm. When the movable part frame of the movable part is located at the second position relative to the fixed part, the shortest distance between the third stopping structure second stopping portion and the first stopping structure third stopping portion is less than 1 mm. The first stopping structure first stopping portion is located between the first stopping structure second stopping portion and the first stopping structure third stopping portion.

In one of the embodiments of the present disclosure, the first stopping structure first stopping portion has a planar structure. The second stopping structure first stopping portion has an arc structure. The radius of curvature of the arc structure of the second stopping structure first stopping portion is greater than 0.05 mm. The radius of curvature of the arc structure of the second stopping structure second stopping portion is greater than 0.05 mm. The first stopping structure second stopping portion have an arc structure.

In one of the embodiments of the present disclosure, the third stopping structure first stopping portion has a planar structure. The radius of curvature of the arc structure of the third stopping structure first stopping portion is greater than 0.05 mm. When viewed along the second axis, the second stopping structure first stopping portion and the second stopping structure second stopping portion are located on opposite sides of a center of the optical element, respectively. When viewed along the second axis, the third stopping structure first stopping portion and the third stopping structure second stopping portion are located on opposite sides of the center of the optical element, respectively.

In one of the embodiments of the present disclosure, the driving assembly includes: a second magnetic lenient; a st cored coil, corresponding to the second magnetic element; and a second magnetic element magnetic conductive element, having a magnetic conductive material, and corresponding to second magnetic element. The first magnetic element with an elongated structure extends along the first axis when viewed along the second axis. The first magnetic element magnetic conductive element with an elongated structure extends along the first axis when viewed along the second axis. The first coil with an elongated structure extends along the first axis when viewed along the second axis.

In one of the embodiments of the present disclosure, the second magnetic element with an elongated structure extends along the first axis when viewed along the second axis. The second magnetic element magnetic conductive element with an elongated structure extends along the first axis when viewed along the second axis. The second coil with an elongated structure extends along the first axis when viewed along the second axis. The second magnetic element is fixedly disposed on the movable part frame. The second coil is fixedly disposed on the fixed part.

In one of the embodiments of the present disclosure, the fixed part further includes: an outer frame, having an opening corresponding to the optical element; and a protective element, fixedly connected to the outer frame, wherein the optical element is located between the protective element and the base when viewed along the first axis. An electromagnetic wave passes through the protective element and is incident to the optical element, and the protective element covers the opening. The protective element is used to position the driving assembly. The protective element has a protective element recessed structure corresponding to the driving assembly. The protective element recessed structure of the protective element corresponds to the first coil magnetic conductive element.

In one of the embodiments of the present disclosure, the first coil magnetic conductive element is exposed to the protective element through the protective element recessed structure of the protective element. A part of the driving assembly is fixed to the protective element by a third connecting element. The third connecting element is in direct contact with the protective element. The third connecting element is located in the protective element recessed structure of the protective element. The third connecting element is in direct contact with the first coil. The third connecting element is in direct contact with the first coil magnetic conductive element.

In one of the embodiments of the present disclosure, the optical element driving mechanism further includes a first supporting assembly and a first sensing assembly. The movable part is movable relative to the fixed part through the support of the first supporting assembly. The driving assembly includes: a first magnetic element; a first coil, corresponding to the first magnetic element; and a second magnetic element, corresponding to the first coil. The fixed part includes: a first positioning structure; a base; and a second positioning structure. The first coil surrounds the first magnetic element when viewed along the second axis. The first coil surrounds the first supporting assembly when viewed along the second axis.

In one of the embodiments of the present disclosure, the first coil surrounds the optical element when viewed along the second axis. The first coil surrounds the first sensing assembly when viewed along the second axis. The first sensing assembly is used for sensing the movement of the movable part relative to the fixed part. The first coil at least partially overlaps the first magnetic element when viewed along any direction that is perpendicular to the second axis. The first coil at least partially overlaps the first support element when viewed along any direction that is perpendicular to the second axis. The first coil does not overlap the optical element when viewed along any direction that is perpendicular to the second axis. The first coil at least partially overlaps the first sensing assembly when viewed along any direction that is perpendicular to the second axis. The first coil is fixedly connected to the first positioning structure.

In one of the embodiments of the present disclosure, the first positioning structure is fixedly connected to the base. The first positioning structure extends along the second axis from the base. The first positioning structure and the base have an integrated structure. The first coil surrounds the first positioning structure when viewed along the second axis. The first coil at least partially overlaps the first positioning structure when viewed along any direction that is perpendicular to the second axis. The first coil is fixedly connected to the second positioning structure. The second positioning structure is fixedly connected to the base. The second positioning structure extends along the second axis from the base. The second positioning structure and the base have an integrated structure.

In one of the embodiments of the present disclosure, the first coil surrounds the second positioning structure when viewed along the second axis. The first coil at least partially overlaps the second positioning structure when viewed along any direction that is perpendicular to the second axis. The alignment direction of the center of the first positioning structure and the center of the second positioning structure is not parallel to the first axis or the third axis when viewed along the second axis. The alignment direction of the center of the first magnetic element and the center of the second magnetic element is not parallel to the first axis or the third axis when viewed along the second axis. The first coil surrounds the second magnetic element when viewed along the second axis. The first coil at least partially overlaps the second magnetic element when viewed along any direction that is perpendicular to the second axis.

In one of the embodiments of the present disclosure, the first magnetic element at least partially overlaps the first positioning structure when viewed along the first axis. The second magnetic element at least partially overlaps the second positioning structure when viewed along the first axis. The first magnetic element at least partially overlaps the second positioning structure when viewed along the third axis. The second magnetic element at least partially overlaps the first positioning structure when viewed along the third axis. The fixed part further includes a first sidewall with a plate-like structure, and a second sidewall with a plate-like structure, wherein the first sidewall and the second sidewall are not parallel to each other. There is a gap between the first coil and the first sidewall. There is a gap between the first coil and the second sidewall. The first coil is not in contact with the first sidewall. The first coil is not in contact with the second sidewall. The fixed part has an accommodating space for accommodating the optical element. The accommodating space is used for accommodating the driving assembly. The accommodating space is used for accommodating the first supporting assembly. The first sidewall and the second sidewall are adjacent to the accommodating space.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The scale of the drawings in the present disclosure may be drawn according to the actual size. The scale of the same figure in the present disclosure can be used as the actual manufacturing scale of the devices, equipment, elements, etc. of the present disclosure. It should be noted that each figure may be drawn at different orientations, which may result in different size ratios among different figures. However, the size ratio shown in an individual figure is not affect by the different size ratios between different figures. People with ordinary skill in the art can understand that the size ratio of the figures in the present disclosure can be used as a distinguishing feature from the prior art.

Figure 1:
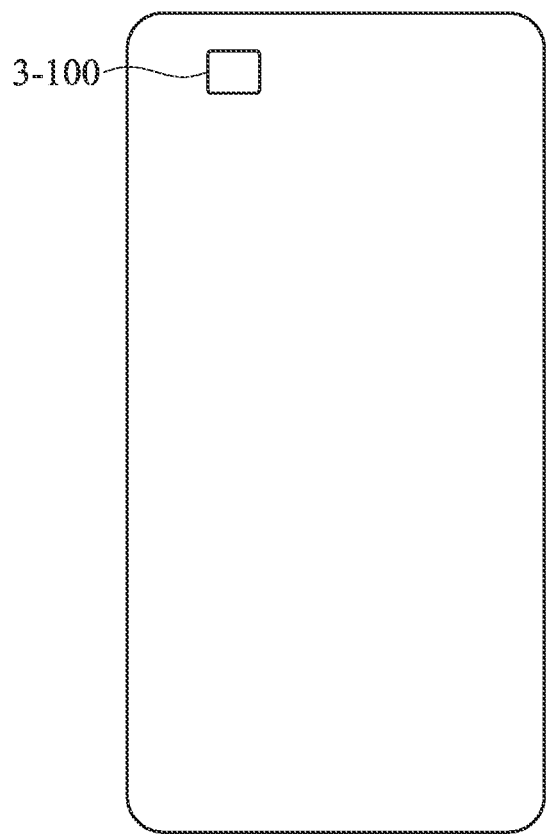
FIG. 1 is a schematic view of an electrical device according to some embodiment of the present disclosure.

Firstly, please refer to FIG. 1, FIG. 1 is a schematic view of an electrical device 3-1 according to some embodiment of the present disclosure. As shown in FIG. 1, an optical element driving mechanism 3-100 of some embodiment of the present disclosure may be mounted in an electrical device 3-1 for taking photos or videos, wherein the aforementioned electrical device 3-1 may, for example, be a smartphone or a digital camera, but the present disclosure is not limited to these. It should be noted that the position and the size between the optical element driving mechanism 3-100 and the electrical device 3-1 shown in FIG. 1 are only an example, which is not for limiting the position and the size between the optical element driving mechanism 3-100 and the electrical device 3-1. In fact, according to different needs, the optical element driving mechanism 3-100 may be mounted at different positions in the electrical device 3-1.

Figure 2:
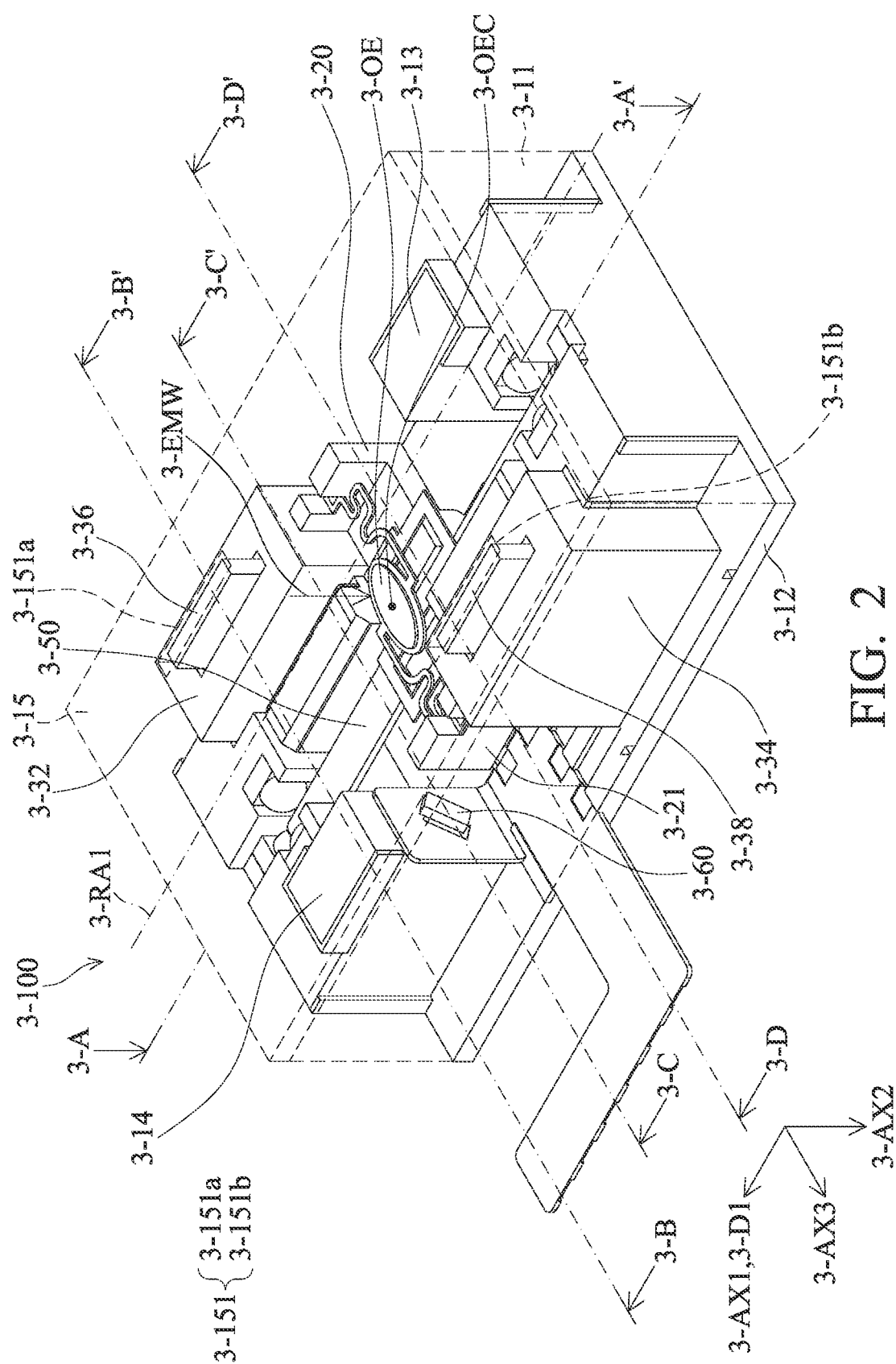
FIG. 2 is a schematic view of an optical element driving mechanism and an optical element according to some embodiments of the present disclosure, wherein an outer frame is shown as a dashed line.
Figure 3:
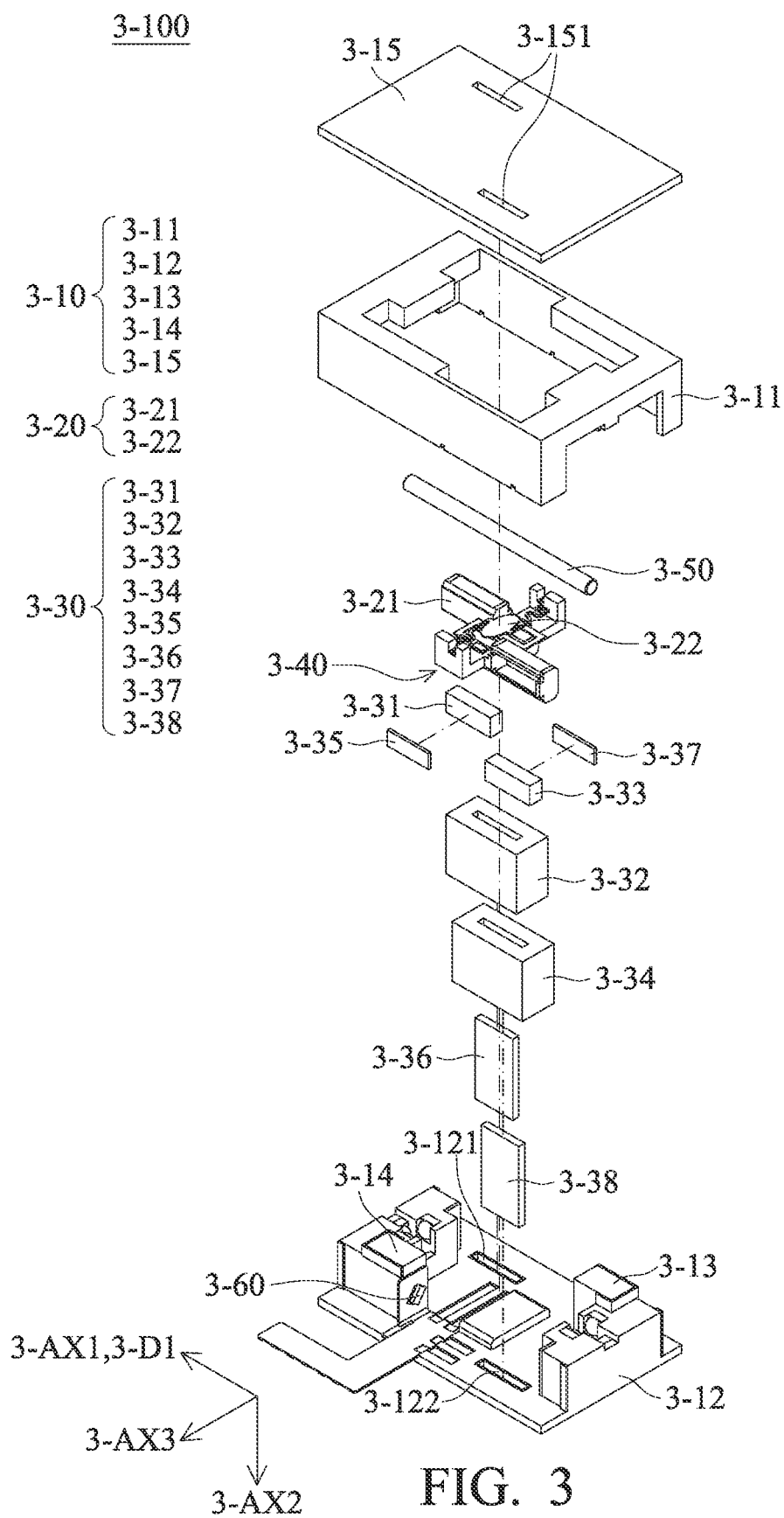
FIG. 3 is an exploded view of the optical element driving mechanism according to some embodiments of the present disclosure.

Please refer to FIG. 2. FIG. 2 is a schematic view of the optical element driving mechanism 3-100 and an optical element 3-OE according to some embodiments of the present disclosure, wherein the outer frame is shown as a dashed line. FIG. 3 is an exploded view of the optical element driving mechanism 3-100 according to some embodiments of the present disclosure.

As shown in FIG. 2 and FIG. 3, the optical element driving mechanism 3-100 may include a fixed part 3-10, a movable part 3-20, a driving assembly 3-30, a stopping assembly 3-40, a first supporting assembly 3-50, a first sensing assembly 3-60, and a connecting element 3-70.

The movable part 3-20 may move relative to the fixed part 3-10, and the driving assembly 3-30 may drive the movable part 3-20 to move relative to the fixed part 3-10. The movable part 3-20 may connect to an optical element 3-OE, and the movable part 3-20 may move relative to the fixed part 3-10 through the support of the first supporting assembly 3-50.

According to some embodiments of the present disclosure, the first supporting assembly 3-50 may be at least partially located between the movable part 3-20 and the fixed part 3-10. According to some embodiments of the present disclosure, the driving assembly 3-30 may be used to drive the movable part 3-20 to move in a first dimension 3-D1.

According to some embodiments of the present disclosure, the stopping assembly 40 may be used to limit the range of motion of the movable part 3-20 relative to the fixed part 3-10. According to some embodiments of the present disclosure, the first sensing assembly 3-60 may be used to sense the movement of the movable part 3-20 relative to the fixed part 3-10. According to some embodiments of the present disclosure, the connecting element 3-70 may be used to connect elements of the optical element driving mechanism 3-100.

The fixed part 3-10 may include an outer frame 3-11, a base 3-12, a first positioning structure 3-13, a second positioning structure 3-14, and a protective element 3-15. The outer frame 3-11 may be disposed on the base 3-12 to form an internal space to accommodate the elements of the optical element driving mechanism 3-100.

According to some embodiments of the present disclosure, the fixed part 3-10 may have an accommodating space (such as the aforementioned internal space) for accommodating the optical element 3-OE.

According to some embodiments of the present disclosure, the accommodating space may be used for accommodating the driving assembly 3-30. According to some embodiments of the present disclosure, the accommodating space may be used to accommodate the first supporting assembly 3-50.

The outer frame 3-11 may have an opening 3-111, and the opening 3-111 may correspond to the optical element 3-OE, so that an electromagnetic wave 3-EMW is incident to the optical element 3-OE. For example, according to some embodiments of the present disclosure, the electromagnetic wave 3-EMW may be visible light, infrared light, ultraviolet light, and the like.

The base 3-12 may include a first coil magnetic conductive element accommodating portion 3-121 and a second coil magnetic conductive element accommodating portion 3-122.

The protective element 3-15 may be fixedly connected to the outer frame 3-11, According to some embodiments of the present disclosure, the optical element 3-OE may be located between the protective element 3-15 and the base 3-12 when viewed along the first axis 3-AX1.

According to some embodiments of the present disclosure, the protective element 3-15 may cover the opening 3-111, According to some embodiments of the present disclosure, the electromagnetic wave 3-EMW may pass through the protective element 3-15, and the electromagnetic wave 3-EMW may be incident to the optical element 3-OE. That is, the protective element 3-15 does not block the electromagnetic wave 3-EMW.

According to some embodiments of the present disclosure, the protective element 3-15 may be used to position the driving assembly 3-30. According to some embodiments of the present disclosure, the protective element 3-15 may have a protective element recessed structure 3-151 that is corresponding to the driving assembly 3-30.

The movable part 3-20 may include a movable part frame 3-21, and a movable part setting surface 3-22. According to some embodiments of the present disclosure, the movable part setting surface 3-22 may be parallel to the first axis 3-AX1. According to some embodiments of the present disclosure, the movable part selling surface 3-22 may be perpendicular to the second axis 3-AX2. According to some embodiments of the present disclosure, the movable part selling surface 3-22 may be parallel to the third axis 3-AX3.

According to some embodiments of the present disclosure, the first axis 3-AX1 may be perpendicular to the second axis 3-AX2. According to some embodiments of the present disclosure, the first axis 3-AX1 may be perpendicular to the third axis 3-AX3. According to some embodiments of the present disclosure, the second axis 3-AX2 may be perpendicular to the third axis 3-AX3.

According to some embodiments of the present disclosure, the optical element driving mechanism 3-100 has an elongated structure, and the optical element driving mechanism 3-100 extends along the first axis 3-AX1 when viewed along the second axis 3-AX2.

According, to some embodiments of the present disclosure, the first dimension 3-D1 may a rotation about a first rotation axis 3-RA1, According to some embodiments of the present disclosure, the first rotation axis 3-RA1 may be parallel to the first axis 3-AX1.

The driving assembly 3-30 may include a first magnetic element 3-31, a first coil 3-32, a second magnetic element 3-33, a second coil 3-34, and a first magnetic element magnetic conductive element 3-35, a first coil magnetic conductive element 3-36, a second magnetic element magnetic conductive element 3-37, and a second coil magnetic conductive element 3-38.

Figure 7:
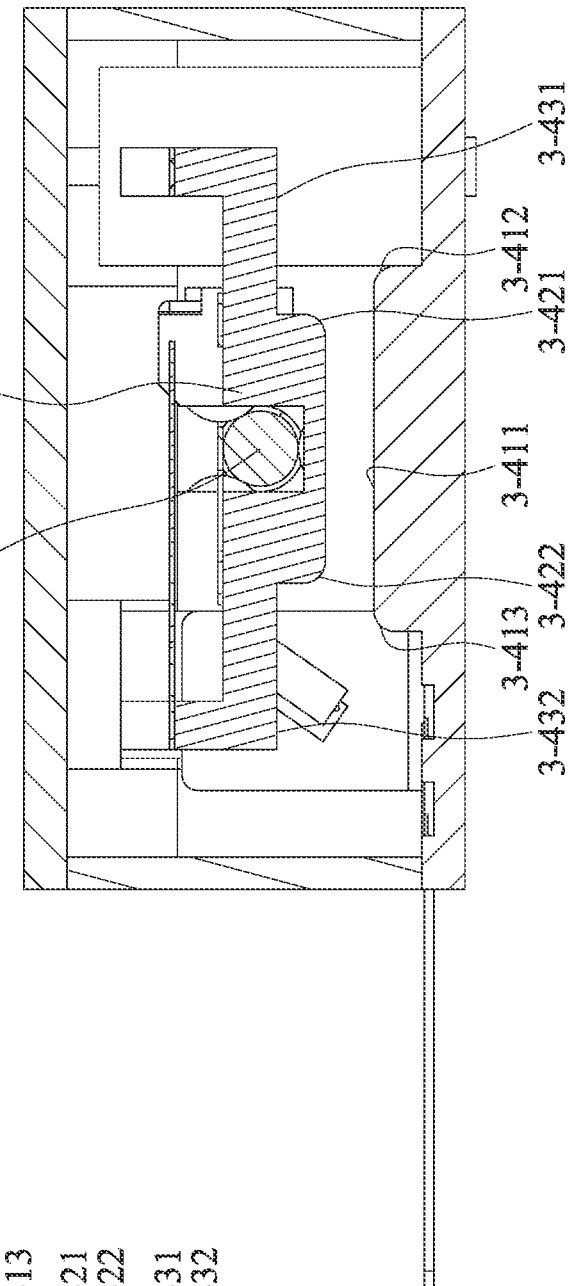
FIG. 7 is a cross-sectional view of the optical element driving mechanism along line 3-C-3-C' of FIG. 2, according to some embodiments of the present disclosure.

The stopping assembly 3-40 may include a first stopping structure 3-41, a second stopping structure 3-42, and a third stopping structure 3-43 (please refer to FIG. 7).

Figure 4:
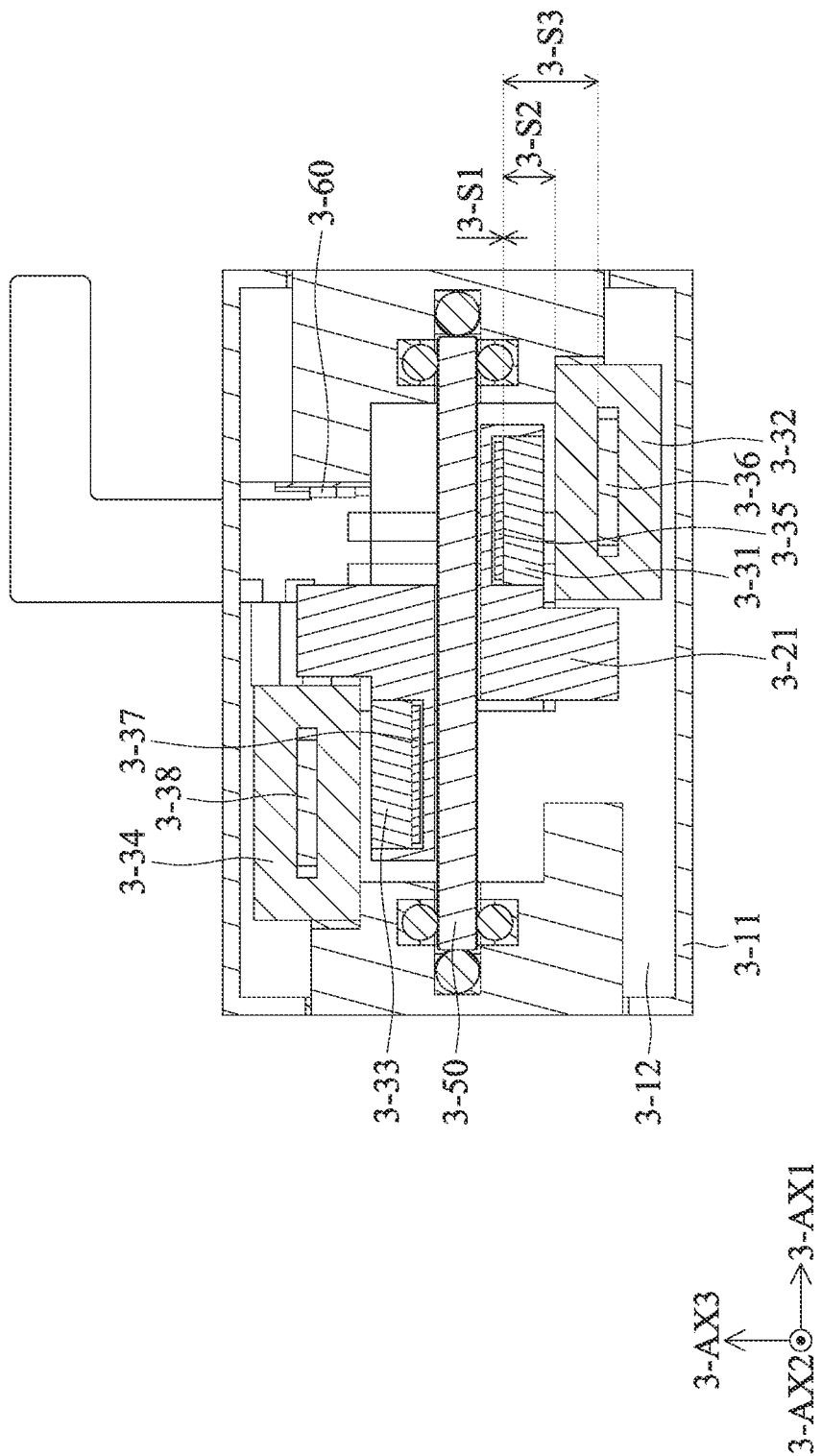
FIG. 4 is a cross-sectional view of the optical element driving mechanism along line 3-A-3-A' of FIG. 2, according to some embodiments of the present disclosure.

Please refer to FIG. 4, FIG. 4 is a cross-sectional view of the optical element driving mechanism 3-100 along line 3-A-3-A' of FIG. 2, according to some embodiments of the present disclosure.

As shown in FIG. 4, according to some embodiments of the present disclosure, the first coil 3-32 may correspond to the first magnetic element 3-31. For example, the first coil 3-32 may be disposed adjacent to the first magnetic element 3-31.

According to some embodiments of the present disclosure, the first magnetic element magnetic conductive element 3-35 may have a magnetic conductive material. According to some embodiments of the present disclosure, the first magnetic element magnetic conductive element 3-35 may correspond to the first magnetic element 3-31. For example, the first magnetic element magnetic conductive element 3-35 may be disposed adjacent to the first magnetic element 3-31.

Please refer to FIG. 4, according to some embodiments of the present disclosure, the first coil magnetic conductive element 3-36 may have a magnetic conductive material. According to some embodiments of the present disclosure, the first coil magnetic conductive element 3-36 may correspond to the first coil 3-32.

According to some embodiments of the present disclosure, the shortest distance 3-S1 (which may be 0) between the first magnetic element magnetic conductive element 3-35 and the first magnetic element 3-31 may be shorter than the shortest distance 3-S2 between the first magnetic element magnetic conductive element 3-35 and the first coil 3-32.

As shown in FIG. 4, according to some embodiments of the present disclosure, the shortest distance 3-S3 between the first coil magnetic conductive element 3-36 and the first magnetic element 3-31 may be greater than the shortest distance 3-S2 between the first magnetic element magnetic conductive element 3-35 and the first coil 3-32.

According to some embodiments of the present disclosure, the first magnetic element 3-31 may be located between the first magnetic element magnetic conductive element3-35 and the first coil magnetic conductive element 3-36 when viewed along the second axis 3-AX2.

Please refer to FIG. 4, according to some embodiments of the present disclosure, the first coil 3-32 may be located around the first coil magnetic conductive element 3-36. According to some embodiments of the present disclosure, the winding axis of the first coil 3-32 may be parallel to the second axis 3-AX2.

According to some embodiments of the present disclosure, the first magnetic element 3-31 may be fixedly disposed on the movable part frame 3-21 of the movable part 3-20. According to some embodiments of the present disclosure, the first magnetic element magnetic conductive element 3-35 may be fixedly disposed on the movable part frame 3-21.

As shown in FIG. 4, according to some embodiments of the present disclosure, the first magnetic element magnetic conductive element 3-35 may be located between the first magnetic element 3-31 and the movable part frame 3-21.

In this way, the driving force of the driving assembly 3-30 may be effectively enhanced, and the effect of miniaturizing the optical element driving mechanism 3-100 may also be achieved.

Figure 5:
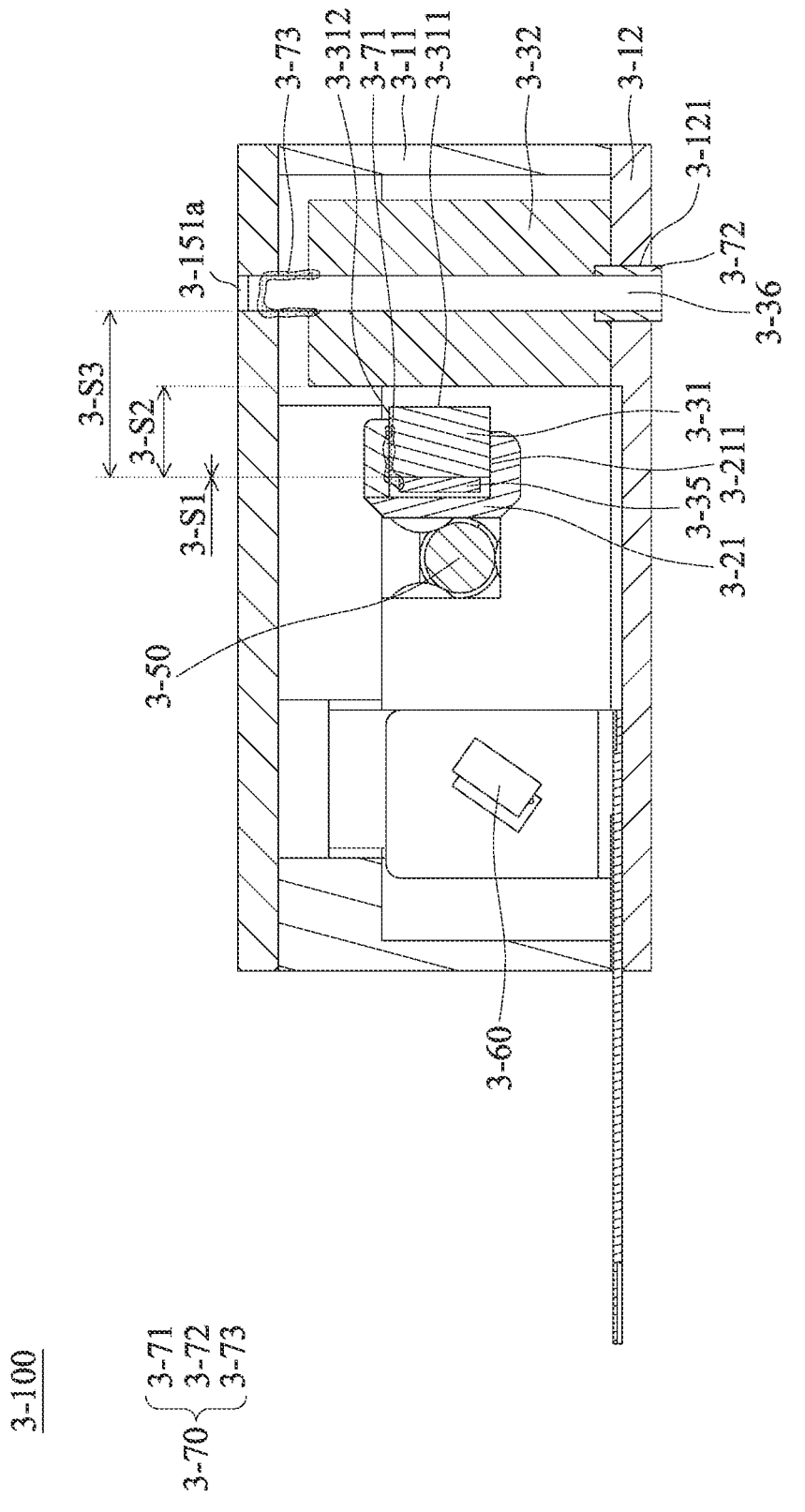
FIG. 5 is a cross-sectional view of the optical element driving mechanism alone line 3-B-3-B' of FIG. 2, according to some embodiments of the present disclosure.

Please refer to FIG. 4 and FIG. 5, wherein FIG. 5 is a cross-sectional view of the optical element driving mechanism 3-100 along line 3-B-3-B' of FIG. 2, according to some embodiments of the present disclosure.

As shown in FIG. 4 and FIG. 5, according to some embodiments of the present disclosure, the first coil 3-32 may be fixedly disposed on the fixed part 3-10. According to some embodiments of the present disclosure, the first coil 3-32 may be fixedly disposed on the base 3-12 of the fixed part 3-10.

The first magnetic element 3-31 may include a first magnetic element first surface 3-311, and a first magnetic element second surface 3-312.

According to some embodiments of the present disclosure, the first magnetic element first surface 3-311 may face the first coil 3-32.

According to some embodiments of the present disclosure, the connecting element 3-70 may include a first connecting element 3-71.

As shown in FIG. 4 and FIG. 5, according to some embodiments of the present disclosure, the first magnetic element 3-31 may be fixedly connected to the movable part frame 3-21 via the first connecting element 3-71.

According to some embodiments of the present disclosure, the first connecting element 3-71 may be in direct contact with the first magnetic element 3-31.

According to some embodiments of the present disclosure, the first connecting element 3-71 may be in direct contact with the first magnetic element second surface 3-312.

Please refer to FIG. 4 and FIG. 5, according to some embodiments of the present disclosure, the first magnetic element second surface 3-312 may not be parallel to the first magnetic element first surface 3-311.

According to some embodiments of the present disclosure, the first magnetic element second surface 3-312 may be perpendicular to the first magnetic element first surface 3-311.

According to some embodiments of the present disclosure, the first magnetic element first surface 3-311 may be perpendicular to the third axis 3-AX3.

According to some embodiments of the present disclosure, the first magnetic element second surface 3-312 may be perpendicular to the second axis 3-AX2.

As shown in FIG. 4 and FIG. 5, according to some embodiments of the present disclosure, the first magnetic element first surface 3-311 and the first magnetic element second surface 3-312 may be parallel to the first axis 3-AX1.

According to some embodiments of the present disclosure, the first connecting element 3-71 may be in direct contact with the movable part frame 3-21.

According to some embodiments of the present disclosure, the first connecting element 3-71 may be in direct contact with the first magnetic element magnetic conductive element 3-35.

In this way, the driving force of the driving assembly 3-30 may be effectively enhanced, and any unwanted movement of the driving assembly 3-30 may be avoided, thereby making the optical element driving mechanism 3-100 more stable.

Please refer to FIG. 4 and FIG. 5, according to some embodiments of the present disclosure, the movable part frame 3-21 may include a first magnetic element accommodating portion 3-211. The first magnetic element accommodating portion 3-211 may correspond to the first magnetic element 3-31.

According to some embodiments of the present disclosure, the first magnetic element second surface 3-312 may be at least partially exposed to the movable part frame 3-21 when viewed along the second axis 3-AX2.

According to some embodiments of the present disclosure, the first magnetic element magnetic conductive element 3-35 may be at least partially exposed on the movable part frame 3-21 when viewed along the second axis 3-AX2.

Figure 6:
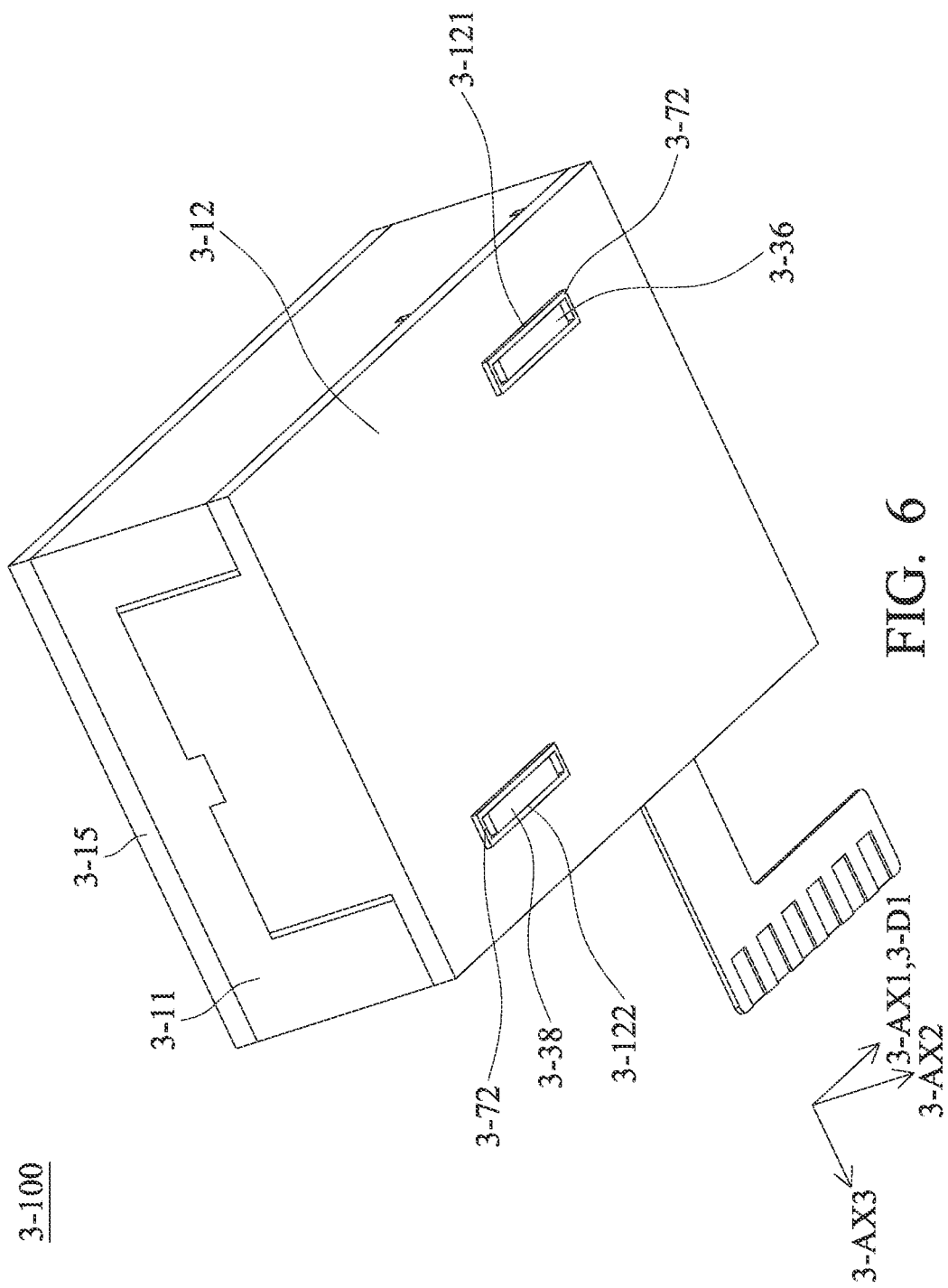
FIG. 6 is a schematic view of an optical element driving mechanism according to some embodiments of the present disclosure.

Please refer to FIG. 5 and FIG. 6, wherein FIG. 6 is a schematic view of an optical element driving mechanism 3-100 according to some embodiments of the present disclosure.

As shown in FIG. 5 and FIG. 6, according to some embodiments of the present disclosure, the first coil magnetic conductive element accommodating portion 3-121 of the base 3-12 of the fixed part 3-10 may correspond to the first coil magnetic conductive element 3-36.

According to some embodiments of the present disclosure, the base 3-12 may have a plate-like structure.

Please refer to FIG. 5 and FIG. 6, according to some embodiments of the present disclosure, the connecting element 3-70 may include a second connecting element 3-72.

According to some embodiments of the present disclosure, the first coil 3-32 may be fixedly connected to the base 3-12 via the second connecting element 3-72.

According to some embodiments of the present disclosure, the second connecting element 3-72 may be in direct contact with the first coil 3-32.

As shown in FIG. 5 and FIG. 6, according to some embodiments of the present disclosure, the second connecting element 3-72 may be in direct contact with the base 3-12.

According to some embodiments of the present disclosure, the second connecting element 3-72 may be disposed in the first coil magnetic conductive element accommodating portion 3-121.

Please refer to FIG. 5 and FIG. 6, according to some embodiments of the present disclosure, the second connecting element 3-72 may be in direct contact with the first coil magnetic conductive element 3-36.

According to some embodiments of the present disclosure, the second connecting element 3-72, the first coil 3-32 and the first coil magnetic conductive element 3-36 may overlap each other when viewed along the third axis 3-AX3.

As shown in FIG. 5 and FIG. 6, for example, according to some embodiments of the present disclosure, the second connecting element 3-72 may be located between the first coil 3-32 and the first coil magnetic conductive elements 3-36 when viewed along the third axis 3-AX3.

In this way, any unwanted movement of the driving assembly 3-30 may be avoided, thereby making the optical element driving mechanism 3-100 more stable. Moreover, the assembly of the optical element driving mechanism 3-100 may also be facilitated, thereby reducing the manufacturing cost of the optical element driving mechanism 3-100.

Please refer to FIG. 5 and FIG. 6, according to some embodiments of the present disclosure, the first coil magnetic conductive element accommodating portion 3-121 may have an opening structure.

According to some embodiments of the present disclosure, the first coil magnetic conductive element 3-36 may be exposed to the base 3-12 through the first coil magnetic conductive element accommodating portion 3-121 when viewed along the first axis 3-AX1.

In this way, the driving force of the driving assembly 3-30 may be effectively enhanced, and the effect of miniaturizing the optical element driving mechanism 3-100 may also be achieved. Moreover, the heat dissipation of the optical element driving mechanism 3-100 may also be facilitated, thereby increasing the smoothness of use of the optical element driving mechanism 3-100.

Please refer to FIG. 7, FIG. 7 is a cross-sectional view of the optical element driving mechanism 3-100 along line 3-C-3-C' of FIG. 2, according to some embodiments of the present disclosure.

As shown in FIG. 7, according to some embodiments of the present disclosure, the second stopping structure 3-42 may correspond to the first stopping structure 3-41. According to some embodiments of the present disclosure, the second stopping structure 3-42 may move relative to the first stopping structure 3-41.

According to some embodiments of the present disclosure, the third stopping structure 3-43 may correspond to the first stopping structure 3-41. According to some embodiments of the present disclosure, the third stopping structure 3-43 may be fixedly connected to the second stopping structure 3-42.

Figure 8:
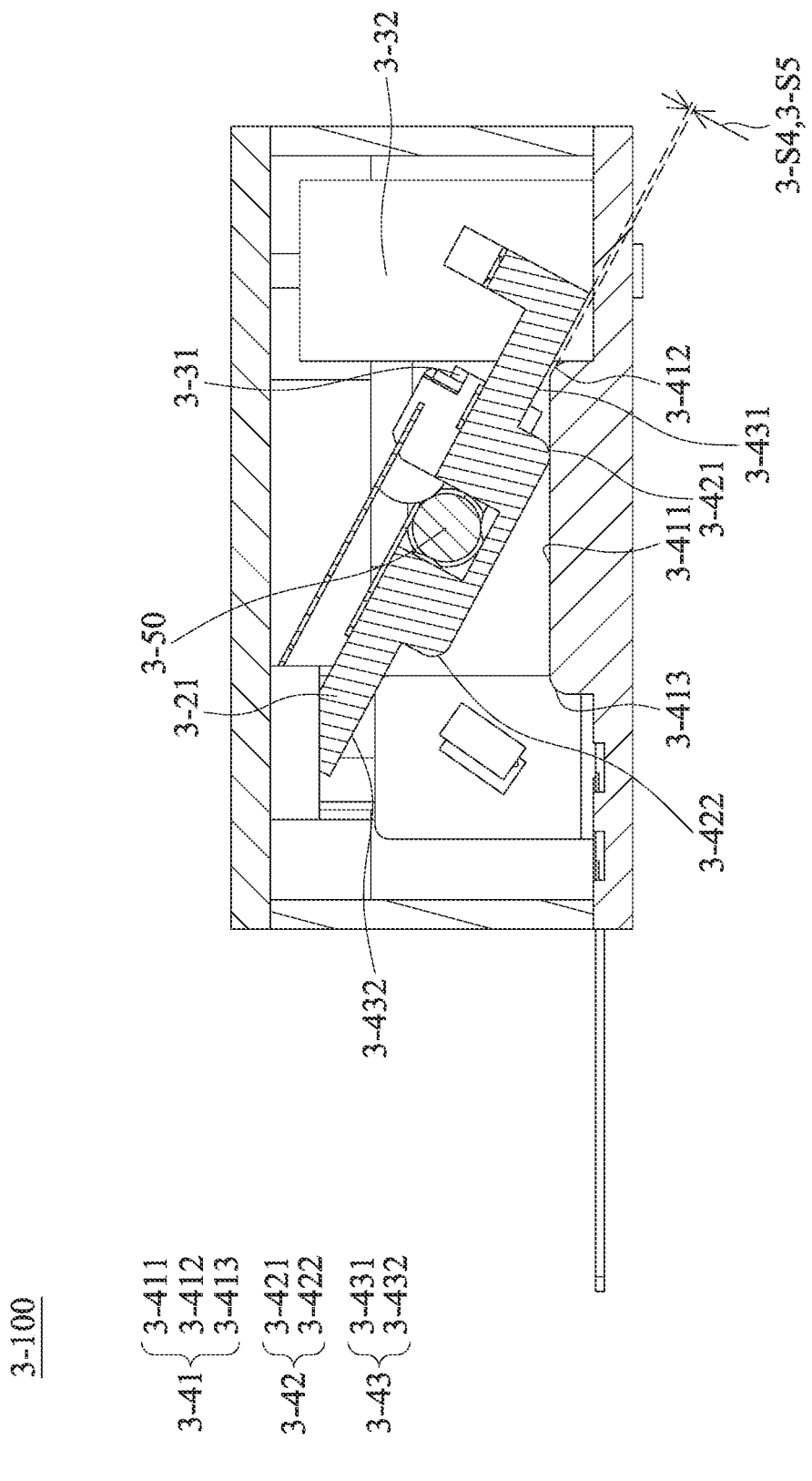
FIG. 8 is a schematic view of a different state of the optical element driving mechanism of embodiments according to FIG. 7, wherein a movable part frame is in a first position.

Please refer to FIG. 8. FIG. 8 is a schematic view of a different state of the optical element driving mechanism 3-100 of embodiments according to FIG. 7, wherein the movable part frame 3-21 is in a first position.

According to some embodiments of the present disclosure, when the movable part frame 3-21 of the movable part 3-20 is located at a first position relative to the fixed part 3-10, the second stopping structure 3-42 may be in direct contact with the first stopping structure 3-41.

According to some embodiments of the present disclosure, when the movable part frame 3-21 of the movable part 3-20 is located at the first position relative to the fixed part 3-10, there may be a gap between the third stopping structure 3-43 and the first stopping structure 3-41.

According to some embodiments of the present disclosure, when the movable part frame 3-21 of the movable part 3-20 is located at the first position relative to the fixed part 3-10, the shortest distance 3-S4 between the third stopping structure 3-43 and the first stopping structure 3-41 may be less than 0.1 millimeter (mm).

As shown in FIG. 8, according to some embodiments of the present disclosure, the first stopping structure 3-41 may be used to fix the driving assembly 3-30.

According to some embodiments of the present disclosure, the first stopping structure 3-41 may be in direct contact with the driving assembly 3-30.

According to some embodiments of the present disclosure, the first stopping structure 3-41 may be in direct contact with the first coil 3-32.

In this way, any unwanted movement of the first coil 3-32 of the driving assembly 3-30 may be avoided, thereby making the optical element driving mechanism 3-100 more stable.

Please refer to FIG. 7, according to some embodiments of the present disclosure, the first stopping structure 3-41 may include a first stopping structure first stopping portion 3-411, a first stopping structure second stopping portion 3-412, and a first stopping structure third stopping portion 3-413.

According to some embodiments of the present disclosure, the second stopping structure 3-42 may include a second stopping structure first stopping portion 3-421, and a second stopping structure second stopping portion 3-422.

According to some embodiments of the present disclosure, the third stopping structure 3-43 may include a third stopping structure first stopping portion 3-431, and a third stopping structure second stopping portion 3-432.

According to some embodiments of the present disclosure, the first stopping structure first stopping portion 3-411 may correspond to the second stopping structure first stopping portion 3-421 and the second stopping structure second stopping portion 3-422.

Figure 9:
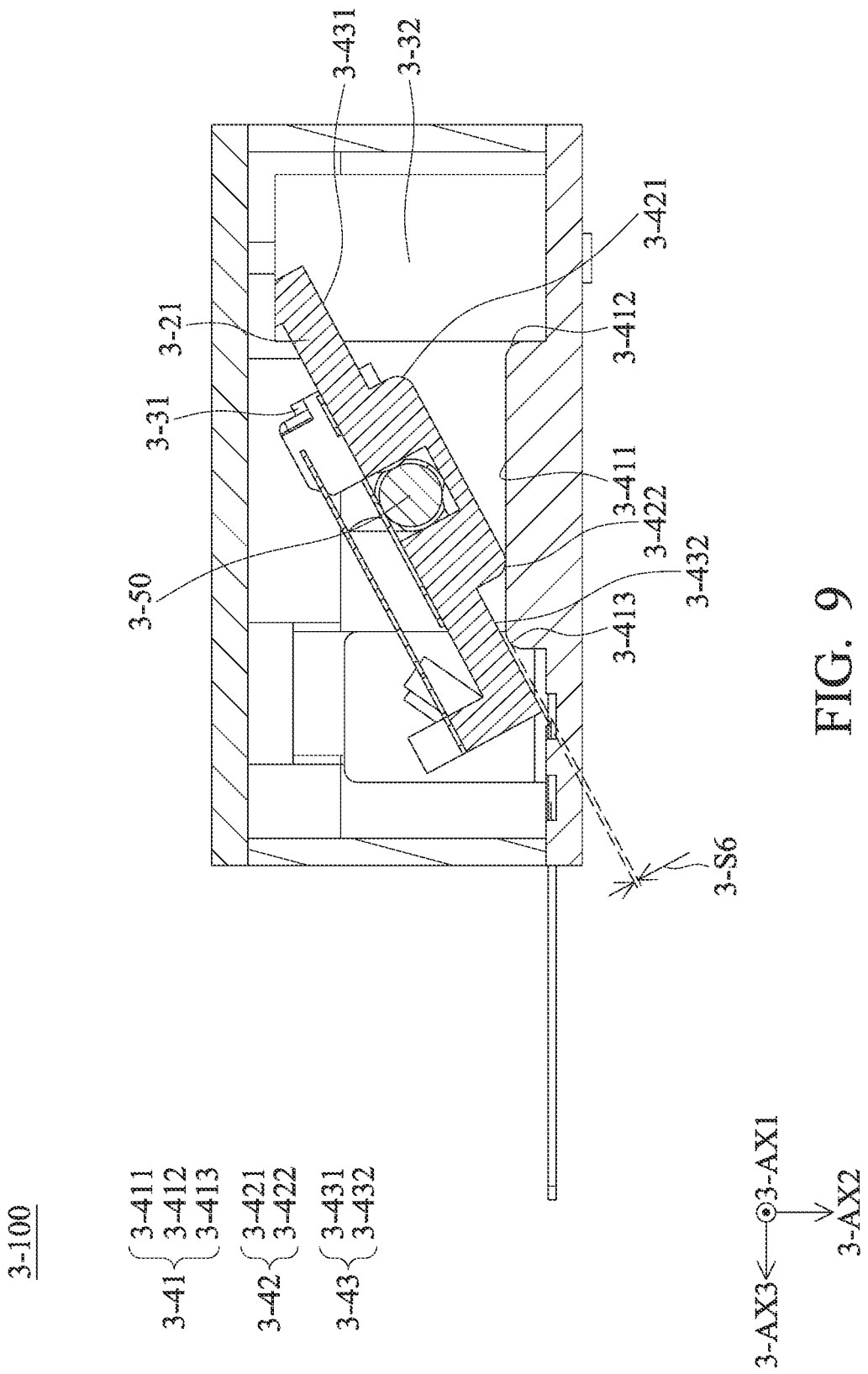
FIG. 9 is a schematic view of a different state of the optical element driving mechanism of embodiments according to FIG. 7, wherein the movable part frame is in a second position.

Please refer to FIG. 8 and FIG. 9. FIG. 9 is a schematic view of a different state of the optical element driving mechanism 3-100 of embodiments according to FIG. 7, wherein the movable part frame 3-21 is in a second position.

According to some embodiments of the present disclosure, when the movable part frame 3-21 of the movable part 3-20 is located at the first position relative to the fixed part 3-10, the second stopping structure first stopping portion 3-421 may be in direct contact with the first stopping structure first stopping portion 3-411.

According to some embodiments of the present disclosure, when the movable part frame 3-21 of the movable part 3-20 is located at the second position relative to the fixed part 3-10, the second stopping structure second stopping portion 3-422 may be in direct contact with the first stopping structure first stopping portion 3-411.

In this way, any unwanted movement of the movable part frame 3-21 may be avoided, thereby preventing the internal elements of the optical element driving mechanism 3-100 from deviating from their positions.

According to some embodiments of the present disclosure, the first stopping structure second stopping portion 3-412 may correspond to the third stopping structure first stopping portion 3-431.

According to some embodiments of the present disclosure, the first stopping structure third stopping portion 3-413 may correspond to the third stopping structure second stopping portion 3-432.

According to some embodiments of the present disclosure, when the movable part frame 3-21 of the movable part 3-20 is located at the first position relative to the fixed part 3-10, the shortest distance 3-S5 between the third stopping structure first stopping portion 3-431 and the first stopping structure second stopping portion 3-412 may be less than 1 mm.

That is, the third stopping structure first stopping portion 3-431 and the first stopping structure second stopping portion 3-412 may be used as backup stopping structures when the optical element driving mechanism 3-100 is impacted.

In this way, any unwanted movement of the movable part frame 3-21 may be avoided, thereby preventing the internal elements of the optical element driving mechanism 3-100 from deviating from their positions.

According to some embodiments of the present disclosure, when the movable part frame 3-21 of the movable part 3-20 is located at the second position relative to the fixed part 3-10, the shortest distance 3-S6 between the third stopping structure second stopping portion 3-432 and the first stopping structure third stopping portion 3-413 may be less than 1 mm.

That is, the third stopping structure second stopping portion 3-432 and the first stopping structure third stopping portion 3-413 may be used as backup stopping structures when the optical element driving mechanism 3-100 is impacted.

In this way, any unwanted movement of the movable part frame 3-21 may be avoided, thereby preventing the internal elements of the optical element driving mechanism 3-100 from deviating from their positions.

Please refer to FIG. 7, according to some embodiments of the present disclosure, the first stopping structure first stopping portion 3-411 may be located between the first stopping structure second stopping portion 3-412 and the first stopping structure third stopping portion 3-413.

According to some embodiments of the present disclosure, the first stopping structure first stopping portion 3-411 may have a planar structure.

According to some embodiments of the present disclosure, the second stopping structure first stopping portion 3-421 may have an arc structure.

According to some embodiments of the present disclosure, the radius of curvature of the arc structure of the second stopping structure first stopping portion 3-421 may be greater than 0.05 mm.

According to some embodiments of the present disclosure, the second stopping structure second stopping portion 3-422 may have an arc structure.

According to some embodiments of the present disclosure, the radius of curvature of the arc structure of the second stopping structure second stopping portion 3-422 may be greater than 0.05 mm.

According to some embodiments of the present disclosure, the first stopping structure second stopping portion 3-412 may have an arc structure.

According to some embodiments of the present disclosure, the radius of curvature of the arc structure of the first stopping structure second stopping portion 3-412 may be greater than 0.05 mm.

According to some embodiments of the present disclosure, the first stopping structure third stopping portion 3-413 may have an arc structure.

According to some embodiments of the present disclosure, the radius of curvature of the arc structure of the first stopping structure third stopping portion 3-413 may be greater than 0.05 mm.

According to some embodiments of the present disclosure, the third stopping structure first stopping portion 3-431 may have a planar structure.

According to some embodiments of the present disclosure, the third stopping structure second stopping portion 3-432 may have a planar structure.

In this way, the structure of the stopping assembly 3-40 may be enhanced, and the stopping assembly 3-40 is prevented from breaking when it is impacted. Furthermore, the unwanted particles from the stopping assembly 3-40 may also be avoided.

Please refer to FIG. 2, FIG. 4, and FIG. 7, according to some embodiments of the present disclosure, when viewed along the second axis 3-AX2, the second stopping structure first stopping portion 3-421 and the second stopping structure second stopping portion 3-422 are located on opposite sides of the center 3-OEC of the optical element 3-OE, respectively.

According to some embodiments of the present disclosure, when viewed along the second axis 3-AX2, the third stopping structure first stopping portion 3-431 and the third stopping structure second stopping portion 3-432 are located on opposite sides the center 3-OEC of the optical element 3-OE, respectively.

In this way, any unwanted movement of the optical element 3-OE may be avoided, thereby improving the accuracy of the optical element driving mechanism 3-100.

Please refer to FIG. 4, according to some embodiments of the present disclosure, the second coil 3-34 may correspond to the second magnetic element 3-33. For example, the second coil 3-34 may be disposed adjacent to the second magnetic element 3-33.

According to some embodiments of the present disclosure, the second magnetic element magnetic conductive element 3-37 may have a magnetic conductive material. According to some embodiments of the present disclosure, the second magnetic element magnetic conductive element 3-37 may correspond to the second magnetic element 3-33. For example, the second magnetic element magnetic conductive element 3-37 may be disposed adjacent to the second magnetic element 3-33.

According to some embodiments of the present disclosure, the first magnetic element 3-31 may have an elongated structure when viewed along the second axis 3-AX2. According to some embodiments of the present disclosure, the first magnetic element 3-31 may extend along the first axis 3-AX1.

According to some embodiments of the present disclosure, the first magnetic element magnetic conductive element 3-35 may have an elongated structure when viewed along the second axis 3-AX2. According to some embodiments of the present disclosure, the first magnetic element magnetic conductive element 3-35 may extend along the first axis 3-AX1.

According to some embodiments of the present disclosure, the first coil 3-32 may have an elongated structure when viewed along the second axis 3-AX2. According to some embodiments of the present disclosure, the first coil 3-32 may extend along the first axis 3-AX1.

In this way, the driving force of the driving assembly 3-30 may be effectively enhanced, and the effect of miniaturizing the optical element driving mechanism 3-100 may also be achieved.

According to some embodiments of the present disclosure, the second magnetic element 3-33 may have an elongated structure when viewed along the second axis 3-AX2. According to some embodiments of the present disclosure, the second magnetic element 3-33 may extend along the first axis 3-AX1.

According to some embodiments of the present disclosure, the second magnetic element magnetic conductive element 3-37 may have elongated structure when viewed along the second axis 3-AX2. According to some embodiments of the present disclosure, the second magnetic element magnetic conductive element 3-37 may extend along the first axis 3-AX1.

According to some embodiments of the present disclosure, the second coil 3-34 may have an elongated structure when viewed along the second axis 3-AX2. According to some embodiments of the present disclosure, the second coil 3-34 may extend along the first axis 3-AX1.

According to some embodiments of the present disclosure, the second magnetic element 3-33 may be fixedly disposed on the movable part frame 3-21.

According to some embodiments of the present disclosure, the second coil 3-34 may be fixedly disposed on the fixed part 3-10. According to some embodiments of the present disclosure, the second coil 3-34 may be fixedly disposed on the base 3-12 of the fixed part 3-10.

In this way, the driving force of the driving assembly 3-30 may be effectively enhanced, and the effect of miniaturizing the optical element driving mechanism 3-100 may also be achieved.

Please refer to FIG. 2 and FIG. 3, according to some embodiments of the present disclosure, the protective element recessed structure 3-151 of the protective element 3-15 may include a protective element first recessed structure 3-151*a* and a protective element second recessed structure 3-151*b*.

According to some embodiments of the present disclosure, the protective element first recessed structure 3-151*a* may correspond to the first coil magnetic conductive element 3-36.

According to some embodiments of the present disclosure, the first coil magnetic conductive element 3-36 may be exposed to the protective element 3-15 through the protective element first recessed structure 3-151*a* of the protective element 3-15.

According to some embodiments of the present disclosure, the protective element second recessed structure 3-151*b* may correspond to the second coil magnetic conductive element 3-38.

According to some embodiments of the present disclosure, the second coil magnetic conductive element 3-38 may be exposed to the protective element 3-15 through the protective element second recessed structure 3-151*b* of the protective element 3-15.

In this way, the driving force of the driving assembly 3-30 may be effectively enhanced, and any unwanted movement of the driving assembly 3-30 may be avoided, thereby making the optical element driving mechanism 3-100 more stable. Moreover, the heat dissipation of the optical element driving mechanism 3-100 may also be facilitated, thereby increasing the smoothness of use of the optical element driving mechanism 3-100.

Figure 10:
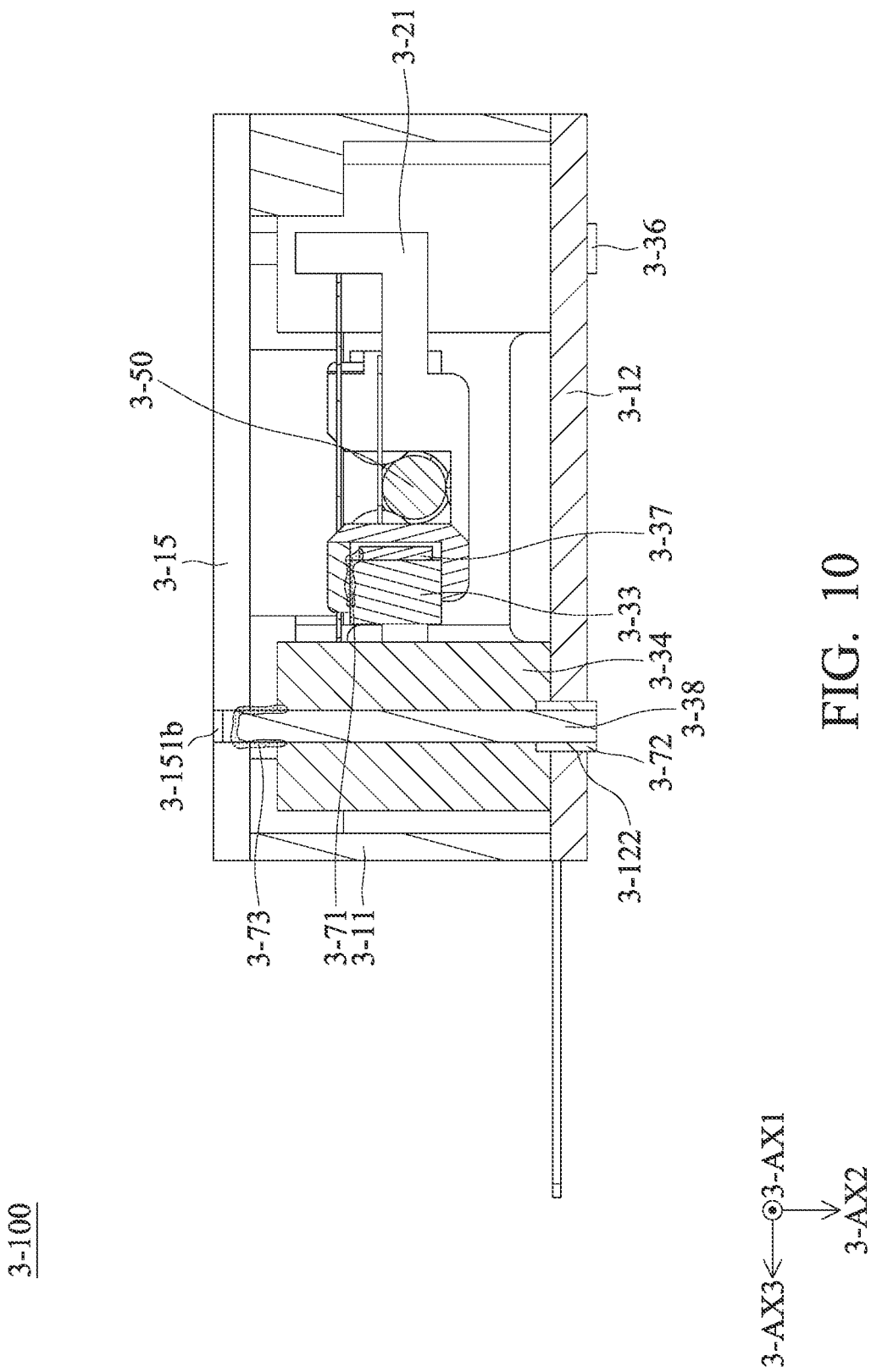
FIG. 10 is a cross-sectional view of the optical element driving mechanism along line 3-D-3-D' of FIG. 2, according to some embodiments of the present disclosure.

Please refer to FIG. 5 and FIG. 10, wherein FIG. 10 is a cross-sectional view of the optical element driving mechanism 3-100 along line 3-D-3-D' of FIG. 2, according to some embodiments of the present disclosure.

According to some embodiments of the present disclosure, the connecting element 3-70 may include a third connecting element 3-73.

According to some embodiments of the present disclosure, a part of the driving assembly 3-30 may be fixed to the protective element 3-15 by the third connecting element 3-73.

According to some embodiments of the present disclosure, the third connection element 3-73 may be in direct contact with the protective element 3-15.

According to some embodiments of the present disclosure, the third connecting element 3-73 may be located in the protective element first recessed structure 3-151*a* and the protective element second recessed structure 3-151*b* of the protective element concave structure 3-151 of the protective element 3-15.

According to some embodiments of the present disclosure, the third connecting element 3-73 may be in direct contact with the first coil 3-32.

According to some embodiments of the present disclosure, the third connecting element 3-73 may be in direct contact with the first coil magnetic conductive element 3-36.

In this way, any unwanted movement of the driving assembly 3-30 may be avoided, thereby making the optical element driving mechanism 3-100 more stable.

Please refer to FIG. 6 and FIG. 10, according to some embodiments of the present disclosure, the second coil magnetic conductive element accommodating portion 3-122 of the base 3-12 of the fixed part 3-10 may correspond to the second coil magnetic conductive element 3-38.

According to some embodiments of the present disclosure, the second coil 3-34 may be fixedly connected to the base 3-12 through the second connecting element 3-72.

According to some embodiments of the present disclosure, the second connecting element 3-72 may be in direct contact with the second coil 3-34.

As shown in FIG. 6 and FIG. 10, according to some embodiments of the present disclosure, the second connecting element 3-72 tray be in direct contact with the base 3-12.

According to some embodiments of the present disclosure, the second connecting element 3-72 may be disposed in the second coil magnetic conductive element accommodating portion 3-122.

Please refer to FIG. 6 and FIG. 10, according to some embodiments of the present disclosure, the second connecting element 3-72 may be in direct contact with the second coil magnetic conductive element 3-38.

According to some embodiments of the present disclosure, the second connecting element 3-72, the second coil 3-34 and the second coil magnetic conductive element 3-38 may overlap each other when viewed along the third axis 3-AX3.

As shown in FIG. 6 and FIG. 10, for example, according to some embodiments of the present disclosure, the second connecting element 3-72 may be located between the second coil 3-34 and the second coil magnetic conductive elements 3-38 when viewed along the third axis 3-AX3.

In this way, any unwanted movement of the driving assembly 3-30 may be avoided, thereby making the optical element driving mechanism 3-100 more stable. Moreover, the assembly of the optical element driving mechanism 3-100 may also be facilitated, thereby reducing the manufacturing cost of the optical element driving mechanism 3-100.

Please refer to FIG. 6 and FIG. 10, according to some embodiments of the present disclosure, the second coil magnetic conductive element accommodating portion 3-122 may have an opening structure.

According to some embodiments of the present disclosure, the second coil magnetic conductive element 3-38 may be exposed to the base 3-12 through the second coil magnetic conductive element accommodating portion 3-122 when viewed along the first axis 3-AX1.

In this way, the driving force of the driving assembly 3-30 may be effectively enhanced, and the effect of miniaturizing the optical element driving mechanism 3-100 may also be achieved. Moreover, the heat dissipation of the optical element driving mechanism 3-100 may also be facilitated, thereby increasing the smoothness of use of the optical element driving mechanism 3-100.

According to some embodiments of the present disclosure, the second coil magnetic conductive element 3-38 may have a magnetic conductive material. According to some embodiments of the present disclosure, the second coil magnetic conductive element 3-38 may correspond to the second coil 3-34.

According to some embodiments of the present disclosure, the shortest distance (which may be 0) between the second coil magnetic conductive element 3-38 and the second magnetic element 3-33 may be shorter than the shortest distance between the second magnetic element 3-37 and the second coil 3-34.

As shown in FIG. 4, according to some embodiments of the present disclosure, the shortest distance between the second coil magnetic conductive element 3-38 and the second magnetic element 3-33 may be greater than the shortest distance between the second magnetic element 3-37 and the second coil 3-34.

According to some embodiments of the present disclosure, the second magnetic element 3-33 may be located between the second magnetic element magnetic conductive element 3-37 and the second coil magnetic conductive element 3-38 when viewed along the second axis 3-AX2.

Please refer to FIG. 4, according to some embodiments of the present disclosure, the second coil 3-34 may be wound around the second coil magnetic conductive element 3-38. According to some embodiments of the present disclosure, the winding axis of the second coil 3-34 may be parallel to the second axis 3-AX2.

According to some embodiments of the present disclosure, the second magnetic element 3-33 may be fixedly disposed on the movable part frame 3-21 of the movable part 3-20. According to some embodiments of the present disclosure, the second magnetic element and the magnetic conductive element 3-37 may be fixedly disposed on the movable part frame 3-21.

As shown in FIG. 4, according to some embodiments of the present disclosure, the second magnetic element magnetic conductive element 3-37 may be located between the second magnetic element 3-33 and the movable part frame 3-21.

In this way, the driving force of the driving assembly 3-30 may be effectively enhanced, and the effect of miniaturization of the optical element driving mechanism 3-100 may also be achieved.

Please refer to FIG. 4 and FIG. 10, according to some embodiments of the present disclosure, the second coil 3-34 may be fixedly disposed on the fixed part 3-10. According to some embodiments of the present disclosure, the second coil 3-34 may be fixedly disposed on the base 3-12 of the fixed part 3-10.

Figure 11:
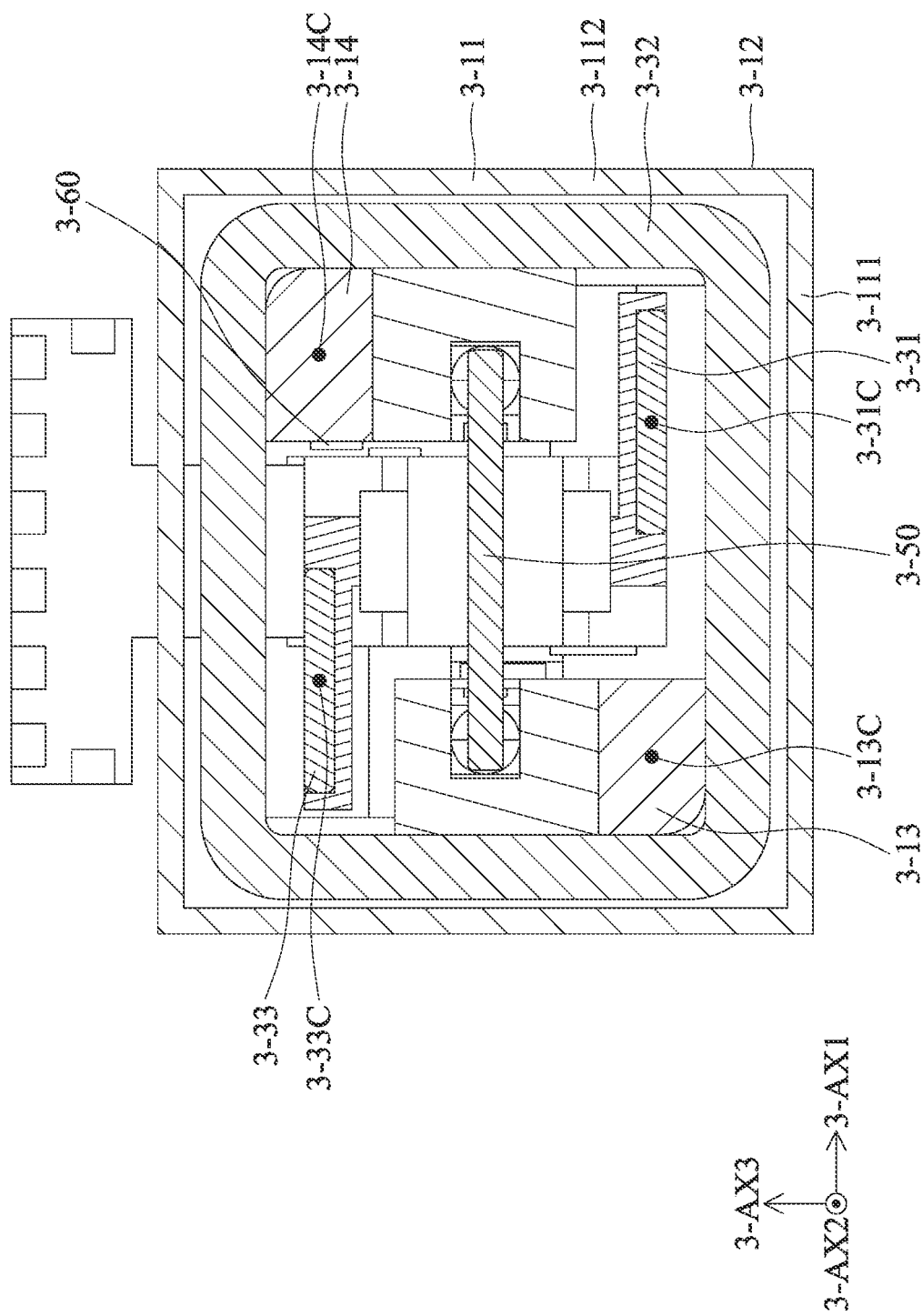
FIG. 11 is a schematic view of a modified embodiment of the optical element driving mechanism according to FIG. 4 of some embodiments of the present disclosure.

Please refer to FIG. 11. FIG. 11 is a schematic view of a modified embodiment of the optical element driving mechanism 3-100 according to FIG. 4 of some embodiments of the present disclosure.

It should be noted that in the embodiment of FIG. 11, the optical element driving mechanism 3-100 may not have the second coil 3-34. Moreover, the first coil 3-32 may extend substantially along the outer frame 3-11.

According to some embodiments of the present disclosure, the first coil 3-32 may surround the first magnetic element 3-31 when viewed along the second axis 3-AX2.

According to some embodiments of the present disclosure, the first coil 3-32 may surround the first supporting assembly 3-50 when viewed along the second axis 3-AX2.

As shown in FIG. 11, according to some embodiments of the present disclosure, the first coil 3-32 may surround the optical element 3-OE when viewed along the second axis 3-AX2.

According to some embodiments of the present disclosure, the first coil 3-32 may surround the first sensing assembly 3-60 when viewed along the second axis 3-AX2.

According to some embodiments of the present disclosure, both the first coil 3-32 and the first magnetic element 3-31 may at least partially overlap each other when viewed along any direction that is perpendicular to the second axis 3-AX2.

According to some embodiments of the present disclosure, both the first coil 3-32 and the first support element 3-50 may at least partially overlap each other when viewed along any direction that is perpendicular to the second axis 3-AX2.

According to some embodiments of the present disclosure, the first coil 3-32 and the optical element 3-OE (not shown in FIG. 11) may not overlap each other when viewed along any direction that is perpendicular to the second axis 3-AX2.

According to some embodiments of the present disclosure, both the first coil 3-32 and the first sensing assembly 3-60 may at least partially overlap each other when viewed along any direction that is perpendicular to the second axis 3-AX2.

According to some embodiments of the present disclosure, the first coil 3-32 may be fixedly connected to the first positioning structure 3-13.

According to some embodiments of the present disclosure, the first positioning structure 3-13 may be fixedly connected to the base 3-12.

According to some embodiments of the present disclosure, the first positioning structure 3-13 may extend from the base 3-12 along the second axis 3-AX2.

According to some embodiments of the present disclosure, the first positioning structure 3-13 and the base 3-12 may have an integrated structure.

As shown in FIG. 11, according to some embodiments of the present disclosure, the first coil 3-32 may surround the first positioning structure 3-13 when viewed along the second axis 3-AX2.

According to some embodiments of the present disclosure, both the first coil 3-32 and the first positioning structure 3-13 may at least partially overlap each other when viewed along any direction that is perpendicular to the second axis 3-AX2.

According to some embodiments of the present disclosure, the first coil 3-32 may be fixedly connected to the second positioning structure 3-14.

According to some embodiments of the present disclosure, the second positioning structure 3-14 may be fixedly connected to the base 3-12.

According to some embodiments of the present disclosure, the second positioning structure 3-14 may extend from the base 3-12 along the second axis 3-AX2.

According to some embodiments of the present disclosure, the second positioning structure 3-14 and the base 3-12 may have an integrated structure.

Please refer to FIG. 11, according to some embodiments of the present disclosure, the first coil 3-32 may surround the second positioning structure 3-14 when viewed along the second axis 3-AX2.

According to some embodiments of the present disclosure, both the first coil 3-32 and the second positioning structure 3-14 may at least partially overlap each other when viewed along any direction that is perpendicular to the second axis 3-AX2.

As shown in FIG. 11, according to some embodiments of the present disclosure, when viewed along the second axis 3-AX2, the alignment direction of the center 3-13C of the first positioning structure 3-13 and the center 3-14C of the second positioning structure 3-14 may not be parallel to either the first axis 3-AX1 or the third axis 3-AX3.

According to some embodiments of the present disclosure, when viewed along the second axis 3-AX2, the alignment direction of the center 3-31C of the first magnetic element 3-31 and the center 3-33C of the second magnetic element 3-33 may not be parallel to either the first axis 3-AX1 or the third axis 3-AX3.

According to some embodiments of the present disclosure, the first coil 3-32 may surround the second magnetic element 3-33 when viewed along the second axis 3-AX2.

According to some embodiments of the present disclosure, both the first coil 3-32 and the second magnetic element 3-33 may at least partially overlap each other when viewed along any direction that is perpendicular to the second axis 3-AX2.

Please refer to FIG. 11, according to some embodiments of the present disclosure, the first magnetic element 3-31 may at least partially overlap the first positioning structure 3-13 when viewed along the first axis 3-AX1.

According to some embodiments of the present disclosure, the second magnetic element 3-33 may at least partially overlap the second positioning structure 3-14 when viewed along the first axis 3-AX1.

According to some embodiments of the present disclosure, the first magnetic element 3-31 may at least partially overlap the second positioning structure 3-14 when viewed along the third axis 3-AX3.

According to some embodiments of the present disclosure, the second magnetic element 3-33 may at least partially overlap the first positioning structure 3-13 when viewed along the third axis 3-AX3.

In this way, the weight of the optical element driving mechanism 3-100 may be balanced, thereby making the optical element driving mechanism 3-100 more stable.

As shown in FIG. 11, according to some embodiments of the present disclosure, the outer frame 3-11 of the fixed part 3-10 may further include a first sidewall 3-112 and a second sidewall 3-113.

According to some embodiments of the present disclosure, the first sidewall 3-112 may have a plate-like structure. According to some embodiments of the present disclosure, the second sidewall 3-113 may have a plate-like structure. According to some embodiments of the present disclosure, the first sidewall 3-112 and the second sidewall 3-113 may not be parallel to each other.

Please refer to FIG. 11, according to some embodiments of the present disclosure, there may be a gap between the first coil 3-32 and the first sidewall 3-112. According to some embodiments of the present disclosure, there may be a gap between the first coil 3-32 and the second sidewall 3-113.

According to some embodiments of the present disclosure, the first coil 3-32 may not be in contact with the first sidewall 3-112. According to some embodiments of the present disclosure, the first coil 3-32 may not be in contact with the second sidewall 3-113.

According to some embodiments of the present disclosure, the first sidewall 3-112 and the second sidewall 3-113 are adjacent to the accommodating space (e.g., the aforementioned internal space) of the fixed part 3-10.

In general, the optical element driving mechanism of the embodiment of the present disclosure may avoid any unwanted movement of the internal elements of the optical element driving mechanism, and prevent the internal elements of the optical element driving mechanism from deviating from their positions, so that the optical element driving mechanism is more stable. Furthermore, the internal elements of the optical element driving mechanism may be avoided from generating unwanted particles, and the accuracy of the optical element driving mechanism may be improved. Furthermore, the optical element driving mechanism of embodiments of the present disclosure may be helpful for assembly, thereby reducing the manufacturing cost of the optical element driving mechanism. In addition, the optical element driving mechanism of embodiments of the present disclosure may be helpful to dissipate heat of the optical element driving mechanism, thereby increasing the smoothness of use of the optical element driving mechanism. Also, the optical element driving mechanism of embodiments of the present disclosure may miniaturize the optical element driving mechanism.

Although embodiments of the present disclosure and their advantages have been described in detail, it should be understood that various changes, substitutions and alterations may be made herein without departing from the spirit and scope of the disclosure as defined 1w the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
a movable part, for connecting an optical element;
a fixed part, wherein the movable part is movable relative to the fixed part; and
a driving assembly, for driving the movable part to move relative to the fixed part,
wherein the driving assembly is used for driving the movable part to move in a first dimension,
wherein the movable part comprises a movable part setting surface,
wherein the movable part setting surface is parallel to a first axis and a third axis,
wherein the first axis is perpendicular to the third axis,
wherein the movable part setting surface is perpendicular to a second axis,
wherein the second axis is perpendicular to the first axis,
wherein the second axis is perpendicular to the third axis,
wherein the optical element driving mechanism with an elongated structure extends along the first axis when viewed along the second axis,
wherein the first dimension is a rotation about a first rotation axis,
wherein the first rotation axis is parallel to the first axis,
wherein the driving assembly comprises:
a first magnetic element;
a first coil, corresponding to the first magnetic element;
a first magnetic element magnetic conductive element, having a magnetic conductive material, and corresponding to the first magnetic element; and
a first coil magnetic conductive element, having a magnetic conductive material, and corresponding to the first coil,
wherein the shortest distance between the first magnetic element magnetic conductive element and the first magnetic element is shorter than the shortest distance between the first magnetic element magnetic conductive element and the first coil,
wherein the shortest distance between the first coil magnetic conductive element and the first magnetic element is greater than the shortest distance between the first magnetic element magnetic conductive element and the first coil,
wherein when viewed along the second axis, the first magnetic element is located between the first magnetic element magnetic conductive element and the first coil magnetic conductive element,
wherein the first coil is wound around the first coil magnetic conductive element,
wherein the winding axis of the first coil is parallel to the second axis.

2. The optical element driving mechanism of claim 1, wherein the first magnetic element is fixedly disposed on a movable part frame of the movable part,
wherein the first magnetic element magnetic conductive element is fixedly disposed on the movable part frame,
wherein the first magnetic element magnetic conductive element is located between the first magnetic element and the movable part frame,
wherein the first coil is fixedly disposed on the fixed part,
wherein a first magnetic element first surface of the first magnetic element faces the first coil,
wherein the first magnetic element is fixedly connected to the movable part frame through a first connecting element,
wherein the first connecting element is in direct contact with the first magnetic element,
wherein the first connecting element is in direct contact with a first magnetic element second surface of the first magnetic element,
wherein the first magnetic element second surface is not parallel to the first magnetic element first surface,
wherein the first magnetic element second surface is perpendicular to the first magnetic element first surface,
wherein the first connecting element is in direct contact with the movable part frame,
wherein the first connecting element is in direct contact with the first magnetic element magnetic conductive element.

3. The optical element driving mechanism of claim 2, wherein the movable part frame further comprises a first magnetic element accommodating portion corresponding to the first magnetic element,
wherein the first magnetic element second surface is at least partially exposed to the movable part frame when viewed along the second axis,
wherein a base of the fixed part further comprises a first coil magnetic conductive element accommodating portion, and the first coil magnetic conductive element accommodating portion corresponds to the first coil magnetic conductive element, wherein the first magnetic element magnetic conductive element is at least partially exposed to the base when viewed along the second axis, wherein the first magnetic element second surface is perpendicular to the second axis, wherein the base has a plate-like structure, wherein the first coil is fixedly connected to the base through a second connecting element.

4. The optical element driving mechanism of claim 3, wherein the second connecting element is in direct contact with the first coil, wherein the second connecting element is in direct contact with the base, wherein the second connecting element is disposed in the first coil magnetic conductive element accommodating portion, wherein the second connecting element is in direct contact with the first coil magnetic conductive element, wherein the second connecting element overlaps the first coil and the first coil magnetic conductive element when viewed along the third axis, wherein the first coil magnetic conductive element accommodating portion has an opening structure, wherein when viewed along the first axis, the first coil magnetic conductive element is exposed to the movable part frame through the first coil magnetic conductive element accommodating portion.

5. The optical element driving mechanism as claimed in claim 3, wherein the driving assembly comprises:
a second magnetic element;
a second coil, corresponding to the second magnetic element; and
a second magnetic element magnetic conductive element, having a magnetic conductive material, and corresponding to the second magnetic element, wherein the first magnetic element with an elongated structure extends along the first axis when viewed along the second axis, wherein the first magnetic element magnetic conductive element with an elongated structure extends along the first axis when viewed along the second axis, wherein the first coil with an elongated structure extends along the first axis when viewed along the second axis.

6. The optical element driving mechanism as claimed in claim 5, wherein the second magnetic element with an elongated structure extends along the first axis when viewed along the second axis, wherein the second magnetic element magnetic conductive element with an elongated structure extends along the first axis when viewed along the second axis, wherein the second coil with an elongated structure extends along the first axis when viewed along the second axis, wherein the second magnetic element is fixedly disposed on the movable part frame, wherein the second coil is fixedly disposed on the fixed part.

7. The optical element driving mechanism as claimed in claim 6, wherein the fixed part further comprises:
an outer frame, having an opening corresponding to the optical element; and
a protective element, fixedly connected to the outer frame, wherein the optical element is located between the protective element and the base when viewed along the first axis, wherein an electromagnetic wave passes through the protective element and is incident to the optical element, and the protective element covers the opening, wherein the protective element is used to position the driving assembly, wherein the protective element has a protective element recessed structure corresponding to the driving assembly, wherein the protective element recessed structure of the protective element corresponds to the first coil magnetic conductive element.

8. The optical element driving mechanism as claimed in claim 7, wherein the first coil magnetic conductive element is exposed to the protective element through the protective element recessed structure of the protective element, wherein a part of the driving assembly is fixed to the protective element by a third connecting element, wherein the third connecting element is in direct contact with the protective element, wherein the third connecting element is located in the protective element recessed structure of the protective element, wherein the third connecting element is in direct contact with the first coil, wherein the third connecting element is in direct contact with the first coil magnetic conductive element.

9. The optical element driving mechanism as claimed in claim 1, further comprising a first supporting assembly and a first sensing assembly, wherein the movable part is movable relative to the fixed part through the support of the first supporting assembly, wherein the driving assembly comprises:
a first magnetic element;
a first coil, corresponding to the first magnetic element; and
a second magnetic element, corresponding to the first coil,
wherein the fixed part comprises:
a first positioning structure;
a base; and
a second positioning structure, wherein the first coil surrounds the first magnetic element when viewed along the second axis, wherein the first coil surrounds the first supporting assembly when viewed along the second axis.

10. The optical element driving mechanism as claimed in claim 9, wherein the first coil surrounds the optical element when viewed along the second axis, wherein the first coil surrounds the first sensing assembly when viewed along the second axis, wherein the first sensing assembly is used for sensing the movement of the movable part relative to the fixed part, wherein the first coil at least partially overlaps the first magnetic element when viewed along any direction that is perpendicular to the second axis, wherein the first coil at least partially overlaps the first supporting assembly when viewed along any direction that is perpendicular to the second axis, wherein the first coil does not overlap the optical element when viewed along any direction that is perpendicular to the second axis, wherein the first coil at least partially overlaps the first sensing assembly when viewed along any direction that is perpendicular to the second axis, wherein the first coil is fixedly connected to the first positioning structure.

11. The optical element driving mechanism as claimed in claim 10, wherein the first positioning structure is fixedly connected to the base, wherein the first positioning structure extends along the second axis from the base, wherein the first positioning structure and the base have an integrated structure, wherein the first coil surrounds the first positioning structure when viewed along the second axis, wherein the first coil at least partially overlaps the first positioning structure when viewed along any direction that is perpendicular to the second axis, wherein the first coil is fixedly connected to the second positioning structure, wherein the second positioning structure is fixedly connected to the base, wherein the second positioning structure extends along the second axis from the base, wherein the second positioning structure and the base have an integrated structure.

12. The optical element driving mechanism as claimed in claim 11, wherein the first coil surrounds the second positioning structure when viewed along the second axis, wherein the first coil at least partially overlaps the second positioning structure when viewed along any direction that is perpendicular to the second axis, wherein the alignment direction of the center of the first positioning structure and the center of the second positioning structure is not parallel to the first axis or the third axis when viewed along the second axis, wherein the alignment direction of the center of the first magnetic element and the center of the second magnetic element is not parallel to the first axis or the third axis when viewed along the second axis, wherein the first coil surrounds the second magnetic element when viewed along the second axis, wherein the first coil at least partially overlaps the second magnetic element when viewed along any direction that is perpendicular to the second axis.

13. The optical element driving mechanism as claimed in claim 12, wherein the first magnetic element at least partially overlaps the first positioning structure when viewed along the first axis, wherein the second magnetic element at least partially overlaps the second positioning structure when viewed along the first axis, wherein the first magnetic element at least partially overlaps the second positioning structure when viewed along the third axis, wherein the second magnetic element at least partially overlaps the first positioning structure when viewed along the third axis, wherein the fixed part further comprises a first sidewall with a plate-like structure, and a second sidewall with a plate-like structure, wherein the first sidewall and the second sidewall are not parallel to each other, wherein there is a gap between the first coil and the first sidewall, wherein there is a gap between the first coil and the second sidewall, wherein the first coil is not in contact with the first sidewall, wherein the first coil is not in contact with the second sidewall, wherein the fixed part has an accommodating space for accommodating the optical element, wherein the accommodating space is used for accommodating the driving assembly, wherein the accommodating space is used for accommodating the first supporting assembly, wherein the first sidewall and the second sidewall are adjacent to the accommodating space.

14. An optical element driving mechanism, comprising:
a movable part, for connecting an optical element;
a fixed part, wherein the movable part is movable relative to the fixed part; and
a driving assembly, for driving the movable part to move relative to the fixed part,
wherein the driving assembly is used for driving the movable part to move in a first dimension,
wherein the optical element driving mechanism further comprising a stopping assembly, for limiting the range of motion of the movable part relative to the fixed part,
wherein the stopper element comprises:
a first stopping structure;
a second stopping structure, corresponding to the first stopping structure and movable relative to the first stopping structure; and
a third stopping structure, corresponding to the first stopping structure and fixedly connected to the second stopping structure,
wherein when a movable part frame of the movable part is located at a first position relative to the fixed part, the second stopping structure is in direct contact with the first stopping structure,
wherein when the movable part frame of the movable part is located at the first position relative to the fixed part, there is a gap between the third stopping structure and the first stopping structure,
wherein when the movable part frame of the movable part is located at the first position relative to the fixed part, the shortest distance between the third stopping structure and the first stopping structure is less than 0.1 mm.

15. The optical element driving mechanism as claimed in claim 14, wherein the first stopping structure is used to fix the driving assembly, wherein the first stopping structure is in direct contact with the driving assembly, wherein the first stopping structure is in direct contact with the first coil, wherein the first stopping structure comprises a first stopping structure first stopping portion, corresponding to a second stopping structure first stopping portion and a second stopping structure second stopping portion of the second stopping structure, wherein when the movable part frame of the movable part is located at the first position relative to the fixed part, the second stopping structure first stopping portion is in direct contact with the first stopping structure first stopping portion, wherein when the movable part frame of the movable part is located at a second position relative to the fixed part, the second stopping structure second stopping portion is in direct contact with the first stopping structure first stopping portion, wherein the first stopping structure further comprises a first stopping structure second stopping portion corresponding to a third stopping structure first stopping portion of the third stopping structure, wherein the first stopping structure further comprises a first stopping structure third stopping portion corresponding to a third stopping structure second stopping portion of the third stopping structure.

16. The optical element driving mechanism as claimed in claim 15, wherein when the movable part frame of the movable part is located at the first position relative to the fixed part, the shortest distance between the third stopping structure first stopping portion and the first stopping structure second stopping portion is less than 1 mm,
   wherein when the movable part frame of the movable part is located at the second position relative to the fixed part, the shortest distance between the third stopping structure second stopping portion and the first stopping structure third stopping portion is less than 1 mm,
   wherein the first stopping structure first stopping portion is located between the first stopping structure second stopping portion and the first stopping structure third stopping portion.

17. The optical element driving mechanism as claimed in claim 16, wherein the first stopping structure first stopping portion has a planar structure,
   wherein the second stopping structure first stopping portion has an arc structure,
   wherein the radius of curvature of the arc structure of the second stopping structure first stopping portion is greater than 0.05 mm,
   wherein the radius of curvature of the arc structure of the second stopping structure second stopping portion is greater than 0.05 mm,
   wherein the first stopping structure second stopping portion have an arc structure.

18. The optical element driving mechanism as claimed in claim 17, wherein the third stopping structure first stopping portion has a planar structure,
   wherein the radius of curvature of the arc structure of the third stopping structure first stopping portion is greater than 0.05 mm,
   wherein when viewed along the second axis, the second stopping structure first stopping portion and the second stopping structure second stopping portion are on opposite sides of a center of the optical element, respectively,
   wherein when viewed along the second axis, the third stopping structure first stopping portion and the third stopping structure second stopping portion are located on opposite sides of the center of the optical element, respectively.

* * * * *